United States Patent [19]

Yaniv et al.

[11] Patent Number: 4,827,085
[45] Date of Patent: May 2, 1989

[54] VOICE AND IMAGE TELECONFERENCING SYSTEM INCLUDING PAPERLESS FACSIMILE MEANS

[75] Inventors: Zvi Yaniv, Farmington Hills; Clive Catchpole, Birmingham, both of Mich.

[73] Assignee: Ovonic Imaging Systems, Inc., Troy, Mich.

[21] Appl. No.: 141,230

[22] Filed: Jan. 6, 1988

Related U.S. Application Data

[63] Continuation-in-part of Ser. No. 122,990, Nov. 19, 1987.

[51] Int. Cl.[4] .................. G08C 21/00; H04M 11/06
[52] U.S. Cl. ................................. 178/18; 379/96; 340/706

[58] Field of Search .............. 178/18, 19; 379/96; 340/706, 758, 771, 784

[56] References Cited

U.S. PATENT DOCUMENTS 4,653,086  3/1987  Laube .................................... 379/96

*Primary Examiner*—Stafford D. Schreyer
*Attorney, Agent, or Firm*—Richard M. Goldman; Marvin S. Siskind; Kenneth M. Massaroni

[57] ABSTRACT

Disclosed is an image data input and display means, and a voice and data electronic teleconferencing system incorporating the image data input and display means. The image data input and display means includes sensor means for inputting image data integrally with means for displaying both the local input image data and remotely inputted image data.

19 Claims, 13 Drawing Sheets

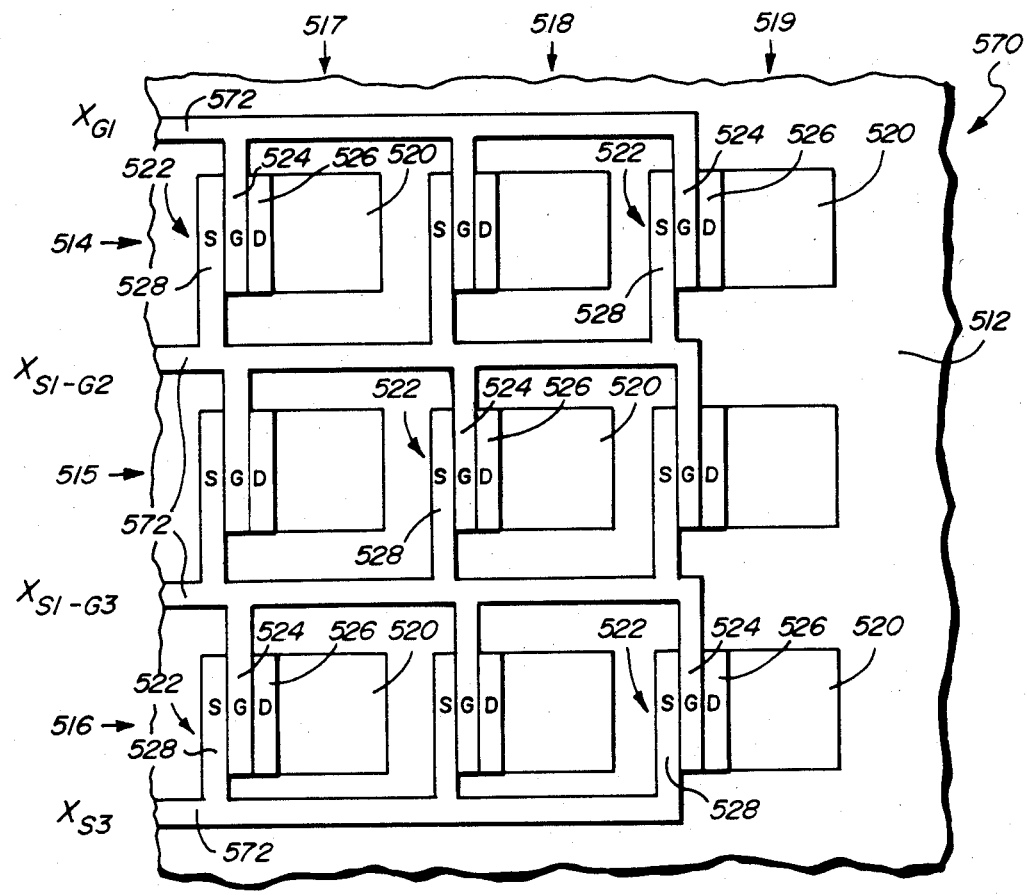
FIG. 23
FIG. 24
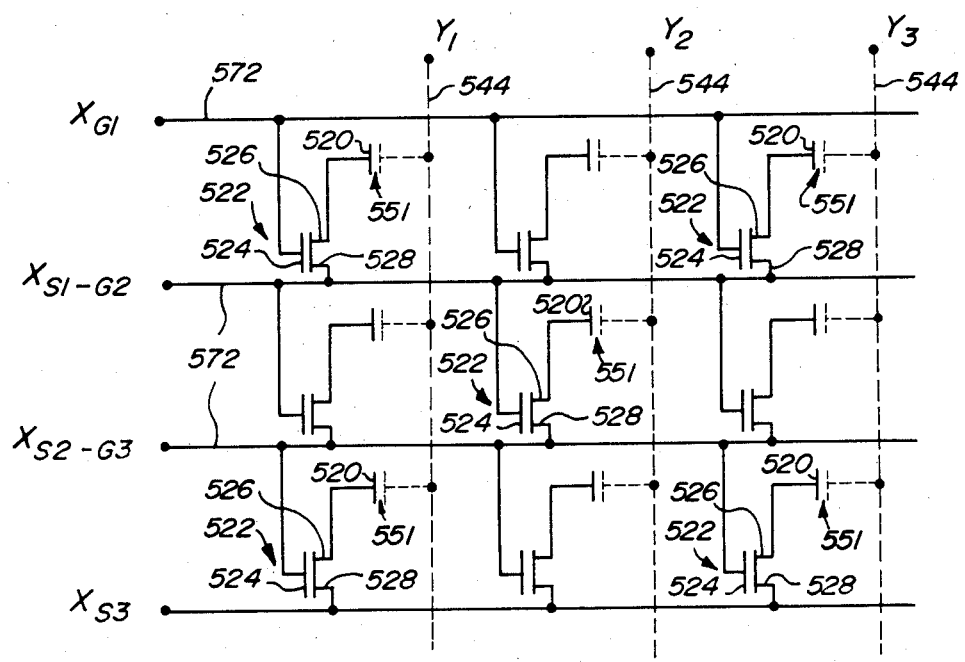

VOICE AND IMAGE TELECONFERENCING SYSTEM INCLUDING PAPERLESS FACSIMILE MEANS

CROSS REFERENCE TO RELATED APPLICATION

This is a continuation-in-part of our commonly assigned, copending U.S. application Ser. No. 122,990 filed Nov. 19, 1987 for SOLID STATE IMAGE DETECTOR AND SIGNAL GENERATOR.

FIELD OF THE INVENTION

The present invention relates generally to electronically operated image data input and display systems, as paperless telefacsimile means, and more particularly to display communications systems having integrated image data input means and visual display means to provide paperless telefacsimile capability in combination with voice capability. The image data input means is adapted to transmit image data to both the integral display and a remote location, while the display is adapted to receive input from both the integral image input means and remote means. The electronic data input means is touch sensitive image data input means capable of simultaneously and accurately digitizing information as that information is entered upon an electrically conductive surface thereof. Such information is electronically displayed and is also transmitted downstream for storage, display, reproduction and/or information processing.

BACKGROUND OF THE INVENTION

Electronic teleconferencing is an economical way of bringing people together for conferences and meetings, without the costs, dislocations, delays and inconveniences associated with travel. In electronic teleconferencing, conferants sit in their own conference rooms and offices, and confer by conference call methodology. Typically, teleconferencing is supported by hard telefacsimile capability. However, teleconferencing systems, to be fully practical, must be capable of two way visual data communications. This requires digitizing visual information input and converting digital data to visual data, i.e., digitizing and displaying data as in a paperless telefacsimile. Recently electronic data transmission devices capable of digitizing and reproducing visual information manually entered upon a surface, e.g., an electrically communicative surface, have been developed and introduced. These devices constituted an independent parallel means of supporting teleconferencing.

The previous data transmission devices adapted for digitizing and reproducing information manually entered on a surface fall generally into one of two categories: digitizing tablet systems and electronic copyboards. Both of these devices possess significant technological limitations for two-way electronic data communications. Electronic copyboards lack the means, structurally and functionally, for reproducing incoming data from a remote location. Digitizing tablets, alone, are incapable of receiving and displaying data from a remote data input source.

Teleconferencing requires the use of one line for voice communications, one line for hand copy facsimile, and one line for data communications. Moreover, no means is provided for interaction between the lines.

BRIEF SUMMARY OF THE INVENTION

The shortcomings of the prior art are obviated by a telephone touch pad for electronic data image communications having, in combination, a touch sensitive position sensor for totally solid state image data entry, a display system in combination therewith and capable of being updated thereby and by external data inputs or data signal processing means, an electronic connection to both, the associated display system and a remote display system so as to provide paperless telefacsimile means, and interconnection, in the case of a system adapted for use with an analog network, means for telecommunication through the analog data communications system. Generally, the analog network will be carrying data signals at frequencies within the acoustical or audible bandwidth from about 300 Hz to 3,400 Hz.

The present invention utilizes an integrated solid state touch sensitive position sensor and a solid state display which synergistically interact with each other. The integrated system is not only capable of simultaneously displaying information entered thereupon, but is also capable of encoding and transmitting that information as well as receiving like information, all in a very accurate manner thereby functioning as a local electronic memo pad and as a paperless telefacsimile means. Therefore, the touch position sensor, display, and associated communications capability of the present invention avoids the limitations inherent in previous electronic teleconferencing and data communication systems and thus, represents a significant advance in the field of integrated electronic data input, display, and communication systems.

The data teleconferencing system of the present invention, which we also refer to herein as a telephone memo pad, includes a paperless telefacsimile means comprising data input and display means. The data input and display means comprises a solid state touch sensitive position sensor having suitable drive means, a solid state display having suitable drive means, first data bus means to allow display of the touch position sensor input on both the related solid state display and a remote display, and second data bus means to allow display of data, from a remote data input on the solid state display.

While the data teleconferencing system may be used with either digital or analog telecommunication network means, and, when used with digital telecommunications network means, with either serial or parallel data, the initial commercial use will most likely be with serial analog data over analog telecommunication means operating acoustical frequencies (300 to 3,400 Hz), i.e., the telephone network. Thus, for communications over voice type networks, the data teleconferencing system further includes: (1) digital to analog conversion means and modulation means for converting the digital output, most frequently parallel data digital output, of the touch sensitive position sensor, into serial analog data output suitable for transmission over an analog telecommunications network: and (2) analog to digital conversion means and demodulation means for converting the serial analog data input received through the analog telecommunications network into data for display. The analog data may be an amplitude and/or frequency modulated electrical signal or an amplitude and/or frequency modulated laser signal. The digital to analog conversion means and the analog to digital conversion means may be separate means or a single means, as a Universal Asynchronous Receiver Transmitter (UART). The modulator and demodulator may be separate means, or a single, combined modulator and demodulator means, e.g., a modem. In a preferred exemplification data processing and memory are provided, e.g., for updating and editing the displayed data, for full duplex operation, and for contemporaneous voice and data transmission.

Data input is through a touch position sensor and the use of touch position sensors will be discussed herein. However, those skilled in the art will readily appreciate that other position detecting input means, e.g., acoustic touch panels, as are well known in the art, can be used without departing from the spirit of the invention. The touch sensitive position sensor is adapted to sense the location of a touch point, and to translate that information into a precise X-Y coordinate of that touch point relative to the conductive surface.

The preferred electronic touch sensitive position sensor for use in the electronic teleconferencing system described herein includes a bounded, conductive, polygonal surface adapted for detecting the X-Y location of touch points thereupon. The position sensor includes at least two sets of current distribution and collection means for establishing an electric field across the conductive surface. The electric field established thereby has a substantially linear field distribution of equipotential lines. The position sensor also includes current control means that are operatively associated with the current distribution and collection means. The current control means are adapted to sequentially switch the said current distribution and collection means from a first to a second condition (i.e., an "off" to an "on" condition). Particularly preferred is the touch sensitive position sensor disclosed in my commonly assigned, copending, U.S. application Ser. No. 122,990, incorporated herein by reference.

One critically important aspect of the touch sensitive position sensor for use in the solid state paperless telefacsimile means is disclosed in commonly assigned, copending, U.S. application Ser. No. 122,990, incorporated herein by reference. This aspect is the establishment of a uniform electric field across the electrically conductive surface of the touch sensitive position sensor. The mechanism for establishing the uniform electric field resides in the current distribution and collection means. Two sets of current distribution and collection means are provided. One member of each set is disposed along one of the opposing boundaries of the conductive surface of the touch position sensor. The current distribution means are orthogonal to each other, with the two members of each set being operatively disposed parallel to one and facing another so as to establish an electric field across both the x and y plane of the conductive surface of the touch position sensor. The mechanism for establishing a uniform electric field across the touch sensitive surface further includes resistance means electrically interconnecting the current distribution and collection means to and through the touch position sensor conductive surface. The current distribution and collection means and the associated resistance means cooperate so as to provide a substantially uniform field distribution, i.e., a linear electric field distribution, with substantially parallel equipotential lines across the entire conductive, image-bearing surface of the touch sensitive position sensor.

As disclosed in greater detail in the aforementioned U.S. application Ser. No. 122,990, the preferred current distribution and collection means is a diode, though other devices, such as an off-stoichiometric $SiN_x$ switch, may function equally well. The current distribution and collection means may also be anisotropic in nature. The anisotropy arises from the high impedance of the current collection and distribution means in one direction, and the low impedance to current flow in an orthogonal direction. More particularly, the current collection and distribution means has high impedance in a direction perpendicular to the intended direction of current flow on the conductive surface of the touch position sensor, i.e., in a direction substantially parallel to the lines of equipotential on the conductive surface of the touch position sensor, and relatively low impedance in a direction orthogonal to the lines of equipotential. The anisotropic impedance results in relatively low impedance in a first direction and relatively high impedance in a second direction.

The current distribution and collection means of the solid state touch position sensor may be a distributed diode, e.g., an elongated distributed diode. In an alternative embodiment, a resistance means is interconnected between the current distribution and collection means and the conductive surface. The resistance means is useful in establishing a uniform, substantially linear field distribution across the surface of the touch position sensor. In an alternative exemplification an elongated, electrically resistive polymeric matrix interposed between the conductive surface and the current collection and distribution means may be employed as the resistance means.

The solid state touch input position sensor is employed in electronically interactive relationship with solid state display means to provide a compact, solid state, electronic paperless telefacsimile means, which is particularly useful as the combined data input and data output means at one terminal of an electronic teleconferencing means.

When formed as an integral, modular unit, the solid state touch position sensor and solid state display synergistically interact to provide the substantially simultaneous, i.e., real time, entry of visually detectable data images (as by touch point or stylus on the touch sensor surface) and the generation of electrical signals corresponding thereto which electrical signals provide an input to create an image on the integral solid state display. Moreover, the signals created thereby can be further processed for transmission to a remote display. The solid state image input and display system of the instant invention utilizes an electrically conductive image input surface in combination with an underlying solid state display. The touch point sensor data input may actually be a thin film structure integral with the display, e.g., a multi-layered composite deposited atop the display and adapted to have data entered thereupon. The data that is entered on the touch point sensor conductor surface is simultaneously (electrically and visually) detectable in the underlying solid state display. This is because each point of information entered upon the touch point sensor surface of the electronic paperless telefacsimile input means corresponds to a unique x-y coordinate thereon. Thus, signals are generated by the touch point sensor means which correspond to at least the x-y location of the touch point. These signals are electronically translated into a visually detectable representation of the data image by the solid state display.

The solid state display utilized in conjunction with the touch position sensor to provide the electronic telefacsimile means is a light influencing display, having a plurality of light influencing individual pixels. Light influencing displays can be formed in many configurations using a number of different types of light influencing materials. By the term "light influencing material" is meant any material which emits light or can be used to selectively vary the intensity, phase, or polarization of light either being reflected from or transmitted through the material. Liquid crystal material is one such material having these characteristics and use of liquid crystal material will be discussed herein. However, those skilled in the art will readily appreciate that other displays, such as electrochromic, electroluminescent, plasma discharge, and vacuum fluorescent (solely by way of illustration and not limitation) can be used without departing from the spirit of the invention. A light influencing display has a plurality of individually switchable pixels or picture elements. The number of pixels may range from tens of pixels to a quarter of a million or more pixels. Generally, each pixel includes a pair of electrodes which can be individually addressed, and liquid crystal material between the electrodes. When a voltage which exceeds a voltage threshold of the liquid crystal material is applied across the electrodes, the optical properties of the liquid crystal material between the electrodes switch to provide a light or dark display.

Liquid crystal displays generally include a large number of pixels (picture elements) arranged in a matrix of rows and columns. Because of the large number of pixels in the matrix arrays, multiplexing is used to selectively address each pixel. To that end, each row of pixels are coupled together by row address lines and each column of pixels are coupled together by column address lines. As a result, each pixel is defined by a unique intersection of its two address lines, i.e., its column address line and its row address line. The pixel is individually addressed by applying a voltage potential across these two intersecting address lines.

Switching may be by a passive matrix or an active matrix. Active matrix displays are preferred for the electronic paperless telefacsimile means of the invention. In a passive matrix the pixel electrodes are directly coupled to the address lines. As a result, in the passive matrix only the characteristic voltage threshold of the display material is relied upon the achieve the selective switching of only those pixels which are addressed with potentials greater than the threshold voltage. Thus, in a passive matrix, the pixels that are in an addressed row and an unaddressed column, or in an addressed column but an unaddressed row can experience an increased voltage potential. However, they will not be switched because the potential increase caused by the potential on only one address line is below the threshold voltage of the display material. The number of pixels which can be employed in liquid crystal displays using a passive matrix is limited by problems of contrast and switching speed. Switching speed is dependent in part on the finite sharpness of the threshold voltage characteristics of the liquid crystal material.

To achieve high resolution, acceptable contrast, and high switching speed in displays having large numbers of pixels, active matrices are necessary. Active matrix displays employ one or more isolation devices at each pixel. The isolation means provide improved threshold voltage sharpness at each pixel and enhanced isolation from applied potentials between the pixels on common address lines. By the term "isolation device" is meant any device which enhances the ability for one pixel to be addressed (switched) without switching or adversely affecting other pixels sharing a common address line therewith. A number of different types of isolation devices are used to provide the required isolation, for example, diodes, and transistors. The role of the isolation device is to reduce or eliminate "cross talk" and provide a more precise voltage threshold than that provided by the light influencing material itself. A more precise voltage threshold means a smaller variance in the voltage required to switch the pixel from off to on.

Active matrix liquid crystal displays which utilize diodes for isolation devices, and which are useful as the display means of the instant invention are disclosed in U.S. application Ser. Nos. 573,004, 675,941, (said applications Ser. No. 573,004 and 675,941 published as European Laid Open Patent Application Nos. 150,728 and 150,798) 082,266, and 089,783, each entitled "Liquid Crystal Displays Operated By Amorphous Silicon Alloy Diodes", and filed in the names of Zvi Yaniv, Vincent D. Cannella, Gregory L. Hansell and Louis D. Swartz, on Jan. 23, 1984, Dec. 3, 1984, Aug. 6, 1987, and Aug. 26, 1987, respectively, U.S. application Ser. No. 918,741, filed Oct. 18, 1986 in the name of Vincent D. Cannella for "Displays And Subassemblies Having Optimized Capacitance"; U.S Pat. No. 4,639,087 issued in the name of Vincent D. Cannella for "Displays And Subassemblies Having Optimized Capacitance"; U.S. patent application Ser. No. 916,914 filed in the name of Yair Baron for "Liquid Crystal Display Pixels With Auxiliary Capacitance"; U.S. Pat. No. 4,589,733 for "Displays And Subassemblies Having Improved Pixel Electrodes" which issued in the names of Zvi Yaniv, Yair Baron, Vincent D. Cannella, and Gregory L. Hansell, which applications and patents are incorporated herein by reference.

BRIEF DESCRIPTION OF THE DRAWINGS

The invention may be best understood by reference to the following Figures appended hereto, which Figures will be briefly described in this section.

FIG. 2A shows an exemplification where the touch position sensor is a separate element. FIG. 2B shows an exemplification where the touch position sensor is a deposit on the display.

FIG. 23 is a representational top plan view of a single substrate subassembly for use in a light influencing display according to one embodiment of the present invention;

FIG. 24 is a schematic circuit diagram of the light influencing display;

DETAILED DESCRIPTION OF THE INVENTION

1. Teleconferencing Unit Including Paperless Telefacsimile Means

Figure 1:
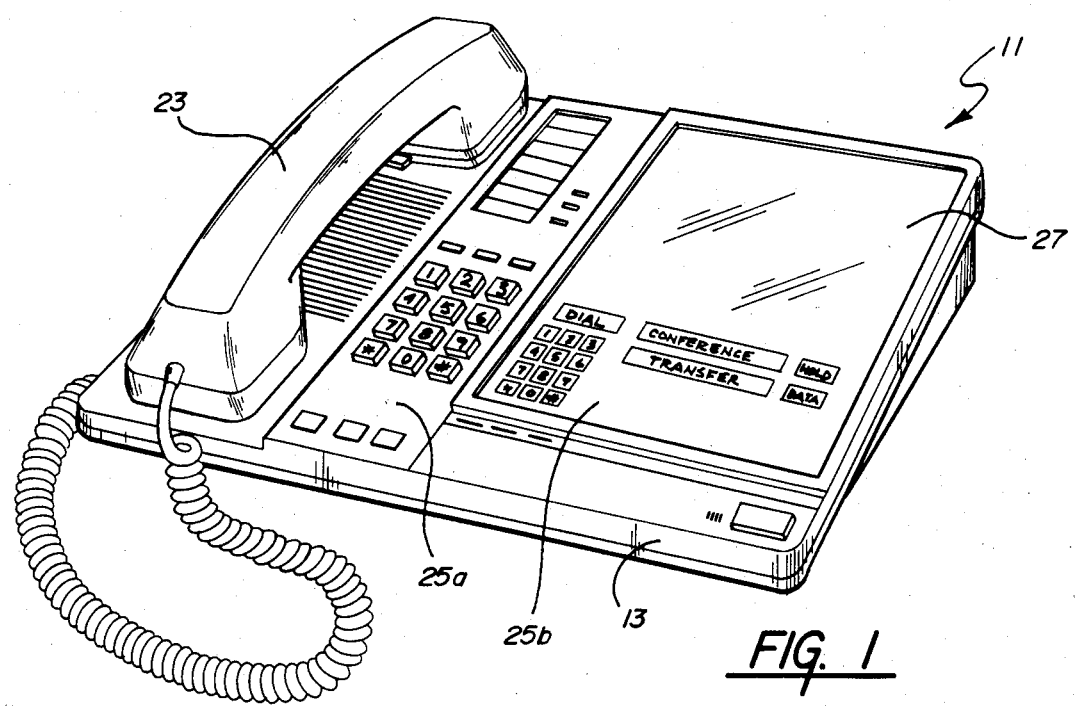
FIG. 1 is a perspective view of a telephone system adapted for electronic teleconferencing and paperless telefacsimile applications, comprising a voice handset, and interactive data image input and display means.

An integrated teleconferencing system 11 including an integrated paperless telefacsimile means 27, is shown in FIG. 1. The system 11 allows substantially parallel and simultaneous voice and data transmission The integrated teleconferencing system 11 is shown in a unit 13 including a voice circuit (element 21 shown in FIGS. 26 and 27) with hand set 23, dial circuit with key pad input 25, and paperless telefacsimile means 27.

The key pad input 25 may be comprised of separate keys 25a, or the key pad input 25 may be incorporated into the paperless telefacsimile means 27 by assigning certain areas of the position sensitive input means 31 to activate certain functions when touched, just as when a push button 25a has been pushed. For example, the touch sensitive input means can act as the dialing circuit input means through displayed touch zone 25b having a one-to-one relationship with push buttons 25a. This has the advantage of completely eliminating mechanical switches. While FIG. 1 shows both mechanical input buttons 25a and display input touch zones 25b, for purposes of illustration, it is to be understood that the mechanical input buttons 25a may be eliminated when the display touch zones 25b are utilized.

Figure 2A:
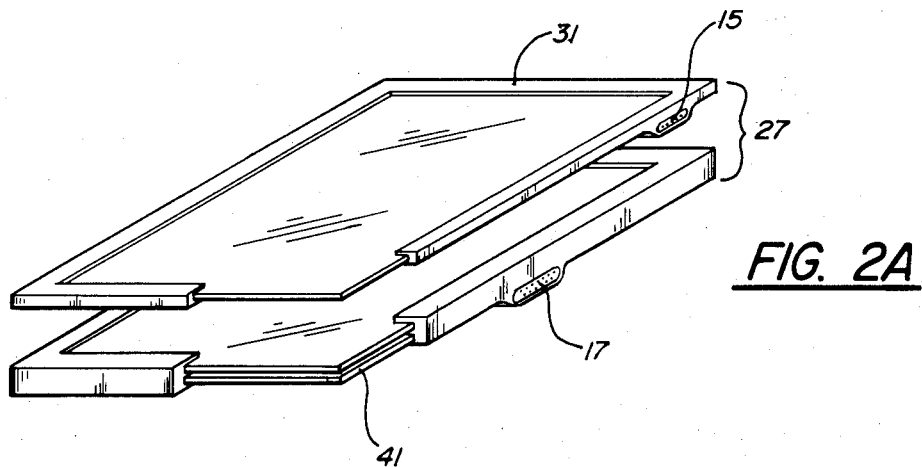
FIGS. 2A and 2B perspective, partially exploded, partial cutaway view of an integral, modular, telephone pad having solid state touch sensitive position sensor means and solid state display means.

Paperless telefacsimile means 27 includes position sensitive input means 31 and display means 41. The position sensitive input means 31, as described herein below, may be an individual element 31 adapted to be collocated with display means 41, as shown in FIG. 2A.

Figure 2B:
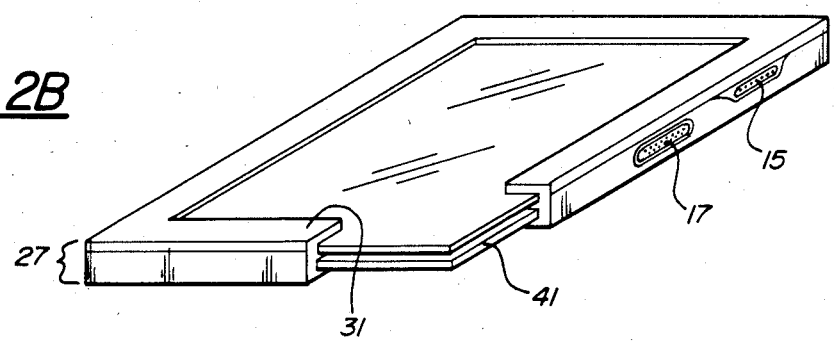

Alternatively, the position sensitive input means 1 may be a coating or layer on the display means, as shown in FIG. 2B.

Input/output interface means include sensor output interface means 15 and display input interface means 17.

The individual elements of the teleconferencing unit are described in Section 2 and 3 below, and the integrated unit, with its interactions and interface unit and elements is described in Section 4, below.

2. Touch Sensor

Figure 3:
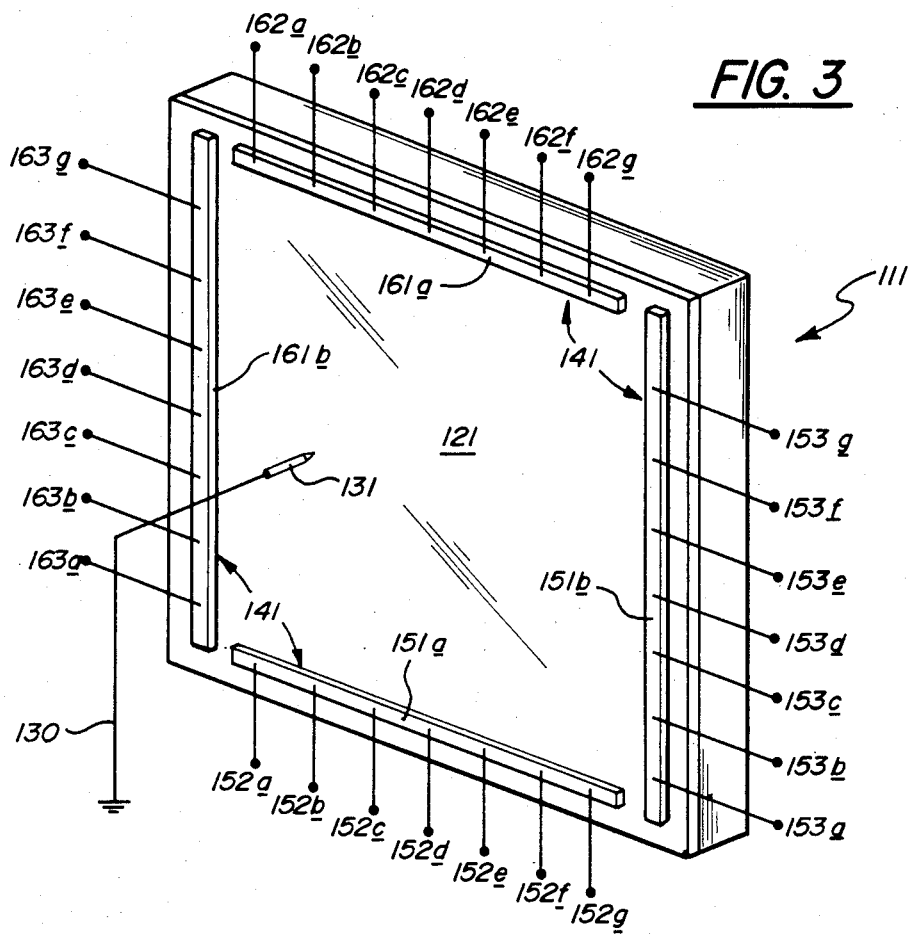
FIG. 3 is a perspective view of an improved, electronic, touch sensitive, position sensor for use with the integral, modular telephone pad of the instant invention, said sensor including the current distribution and collection means.

The improved, solid state, touch sensitive position sensor used as the input device of the instant invention is indicated generally in FIG. 3 by the reference numeral 111. The position sensor 111 depicted in FIG. 3 includes a generally rectangularly-shaped, electrically conductive, exposed surface 121 that is specifically adapted for detecting and signalling the X-Y coordinate location of a touch point 131, such as the finger of a user or a stylus, placed in contact with the surface 121.

In order to accomplish the function of touch point 131 location detection, the position sensor 111 includes at least two sets of current distribution and collection means, generally 141. The current distribution and collection means 141 establishes a uniform linear electric field across the conductive surface 121 thereof. More specifically, the electric field distribution is established by a first elongated, current distribution means 151a, disposed along at least one boundary of the conductive surface 121 (such as the lower horizontal boundary thereof) and a first, elongated, current collection means 161a operatively disposed along at least a second boundary of the conductive surface 121. The current distribution means 151a and the current collection means 161a are parallel to and face each other on the conductive surface 121. The first set of current distribution and collection means, 151a and 161a are operatively disposed along two opposite boundaries of the conductive surface 121 of the position sensor 111 and are adapted to cooperatively provide a substantially uniform, linear electric field distribution of substantially parallel equipotential lines E (see FIG. 4) across the conductive surface 121. In a preferred embodiment, as described hereinafter, the current distribution and collection means are formed as distributed diodes, though other devices may be employed with equal success.

In the rectangularly-shaped, touch sensitive position sensor 111 illustrated in FIG. 3 the first horizontally disposed current distribution means 151a and the first horizontally disposed, but vertically spaced, current collection means 161a cooperate to establish a first uniform electric field distribution with a first set of horizontal equipotential lines. This provides high resolution means of determining the y axis coordinate of the touch point. A second set of current distribution and collections means 141 are required in order to provide a x axis coordinate location. More specifically, the second set of current distribution and collection means includes one elongate, current distribution and collection means 151b disposed along one vertical boundary of the conductive surface 121 and a second elongate, current distribution and collection means 161b disposed along the opposite vertical boundary of the conductive surface 121, horizontally spaced from said second current distribution means 151b. The second set of vertically oriented, spacedly positioned, current distribution and collection means, 151b and 161b, cooperate to establish a second set of uniformly spaced equipotential lines having a second electric field distribution orthogonal to the equipotential lines of the first field distribution. This provides x axis coordinate location determination means of high resolution.

The current distribution and collection means 151a, 151b, 161a, 161b contain a plurality of current leads (such as 152a, 152b, 151c . . . 152m; and 162a, 162b, 162c . . . 162m; 153a, 153b, 153c . . . 153m; and 163a, 163b, 163c . . . 163m) equally spaced along the lengths thereof. These current leads provide for the flow of electrical current through the current distribution and collection means to the conductive surface 121 of the position sensor 111, thereby establishing an electric field there across, which field results in a flow of current between the oppositely disposed and charged distribution and collection means (151a and 161a; 151b and 161b). In a preferred embodiment, the current leads are arranged in a configuration of approximately 40 lines per inch, though any given resolution (from 2 lines to 100 or more lines per inch) may be employed. However, it is to be understood that the number of current leads per unit length is limited by the requirement that cross-talk between adjacent current leads must be substantially prevented.

In the current distribution and collection means, the lateral distance between adjacent current leads must be such as to provide relatively high impedance to current flow therebetween, as compared to the effective impedance path along the conductive surface 121 of the position sensor 111. In this way current is preferentially conducted in a direction other than along the length of the current distribution and collection means. The resolution of the touch position sensor 111 (defined as the accuracy of determining a specific X-Y coordinate location of a touch input on the conductive surface) is determined by the uniformity and linearity of the field across the conductive surface, especially along edges of said surface nearest the disengaged current distribution and collection means, wherein the impedance of the disengaged current distribution and collection means must be fairly high to avoid the flow of current thereinto.

Electrically interconnected with each of the current distribution and collection means, 151a, 151b, 161a and 161b, are current control means (not shown). The current control means sequentially turn on and off, in alternating manner, the sets of current distribution and collection means 141. The current control means must be capable of switching from a substantially on condition to a substantially off condition, without allowing any leakage of current while in the off state.

The touch sensitive position 111 sensor further includes a resistance means electrically disposed between said current distribution and collection means 141 and said bounded conductive surface 121. It is preferred that the resistance means be capable of providing resistance substantially the same as the resistance of the conductive surface 121, and typically within the rang of 10 to 1000 ohms, and most preferably 50 to 500 ohms.

Figure 5:
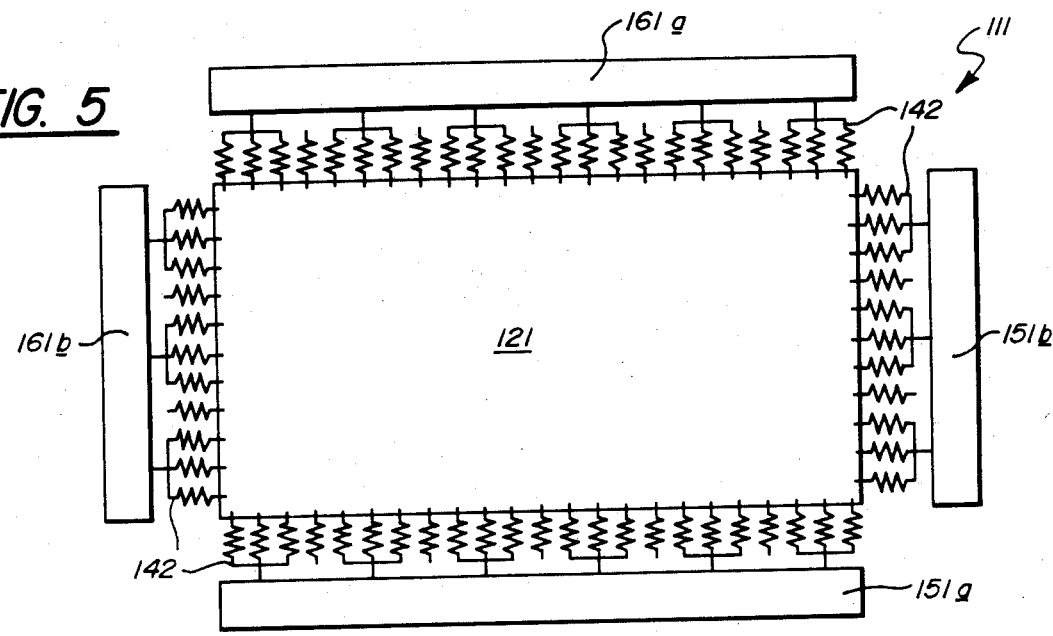
FIG. 5 is a schematic view of the touch sensitive position sensor, incorporating a resistance means interposed between said current distribution and collection means and said conductive surface.
Figure 6A:
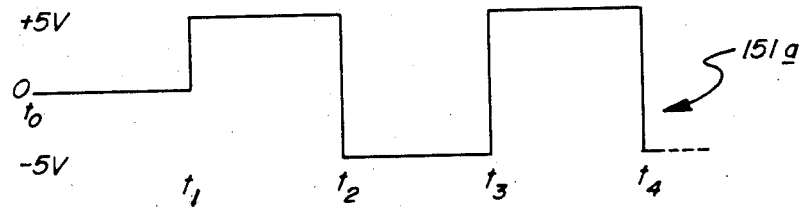
FIGS. 6A through 6D are a series of waveforms which illustrate the sequence of charging potentials applied to the current control means, and associated current distribution and collection means of the touch sensitive position sensor for alternately, sequentially scanning x-y fields of the touch sensitive sensor to determine the location of a touch point entered thereupon.
Figure 6B:
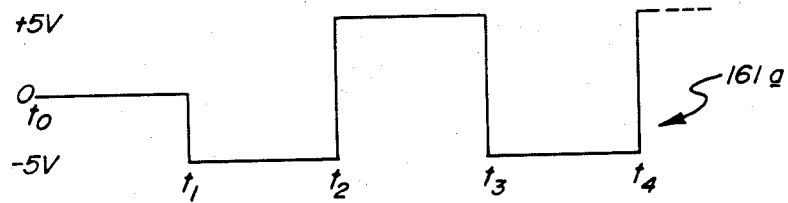
Figure 6C:
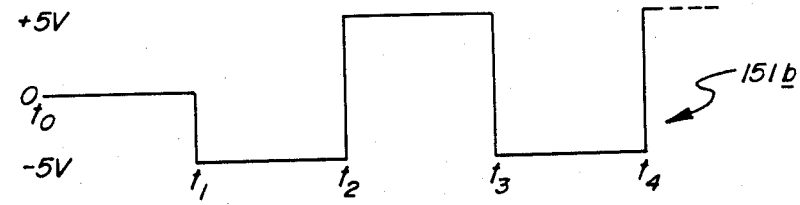
Figure 6D:
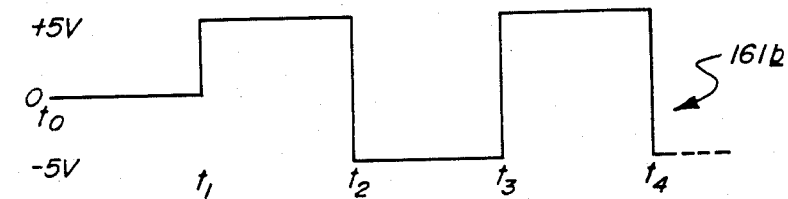

Turning now to FIG. 5, there is illustrated therein a schematic view of the touch sensitive position sensor 111, including current distribution and collection means 151a, 161a, 151b, and 161b, having resistance means, generally 142 attached between the distribution and collection means and said conductive surface 121. The resistance means are attached to the current leads (such as 152a, 152b, 152c . . . ) of the current distribution and collection means. The resistance means are then affixed directly upon the conductive surface 121 of the touch sensitive position sensor 111.

The exact principle employed in electrically determining the x-y location of the touch point 131 can be best described as follows. The conductive surface 121 of the sensor 111 is continually scanned by a stream of discrete scanning cycles. The scanning cycles are triggered by associated timing means adapted to correlate the location of a touch point 131 with respect to the distributed electric field. Specifically, each scanning cycle, of which there may be approximately 500 per second, (the actual number of scanning cycles per second is an independent variable which may be within the range of 10 to 10,000 cycles per second) comprises two half cycles; the first half cycle is dedicated to determining the y-axis touch point 131 location by energizing the first or y-axis current distribution and collection means, 151a and 161a, and the second half cycle is dedicated to determining the x-axis location of the touch point 131 by energizing the second or x-axis current distribution and collection means, 51b and 61b.

Turning now to FIG. 6, there is illustrated therein the waveform of voltages applied to the first or y-axis current distribution and collection means, 151a and 161a and the second or x-axis current distribution and collection means, 151b and 161b, to achieve alternating half cycle scanning. From time $t_0$ through $t_1$ all current distribution and collection means are held at a 0 volt potential as in the case where the touch sensitive position sensor is in its off mode. At time $t_1$ through $t_2$, in order to determine the y-axis location of the touch point 131, the current control means associated with current distribution means 151a and current collection means 161a are switched into an "on" or forward biased condition by applying voltage of +5 v and −5 v thereto respectively. This allows a uniform electric field to be distributed across the display surface 121 of the touch sensor. At the same time, ($t_1$ thru $t_2$) the current control means associated with current distribution and collection means 151b and 161b are in an "off" or reversed biased condition, as shown in FIG. 6c and 6d, by applying voltages such as −5 v and +5 v thereto respectively (when the current distribution and collection means 151b and 161b are diodes, the voltages applied to the diodes is substantially equal in magnitude and less than the reverse bias breakdown voltages of the diodes). Thus, a uniform electric field is established across the touch sensor-display surface in the y-asix thereof during the first half cycle of a complete scanning cycle.

During the second half cycle, the current control device associated with current distribution and collection means 151b and 161b switch the current distribution and collection means 151b and 161b into an "on" or forward biased condition by reversing the voltages applied thereto during the first half cycle, while the current control devices associated with current distribution and collection means 151a and 161a are switched into an "off" or reverse biased condition, again by reversing the voltage applied thereto during the first half cycle. Biasing the diodes in this way provides for establishing a uniform electric field in the x-axis of the position sensor 121, and thus, allowing for determining the x-axis location of the touch point 131. It is important to note that these scanning cycles are continually being initiated so as to constantly update the location of all information entered upon the touch sensor-display surface 121.

The correlation of the location of the touch point 131 relative to the distributed electric field is accomplished by position correlation means (not shown). The position correlation means compares the instantaneous electrical field and/or current distribution to the overall field and/or current distribution, thereby precisely pinpointing the location of the touch point 131. As illustrated in FIG. 6, the scanning cycles are initiated at all times while the sensor 111 is in operation, thus continually updating the status of the input information. Further, as should be apparent, the preferred current control device must be capable of being switched from an "off" to an "on" condition.

Figure 4:
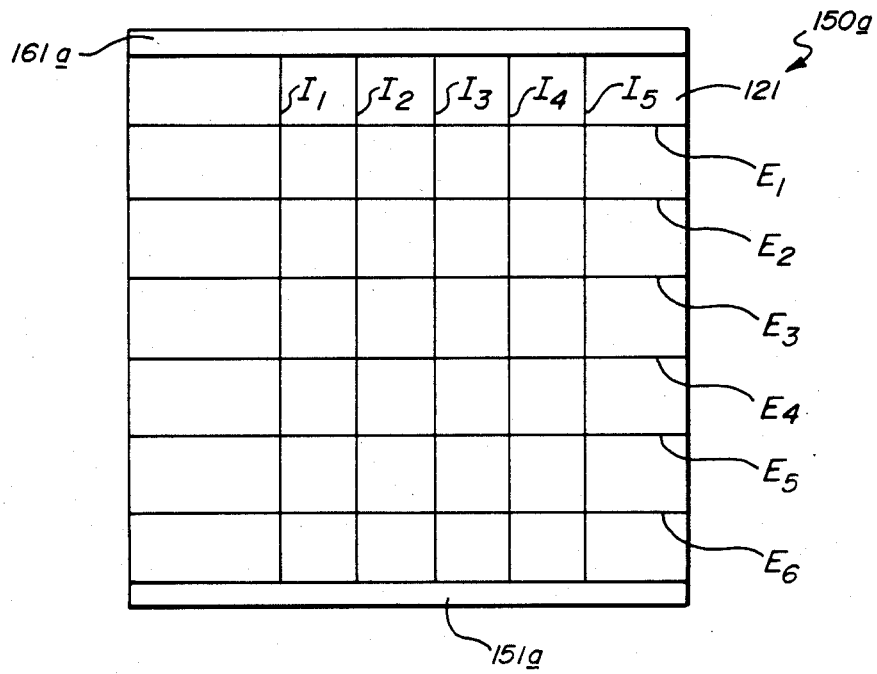
FIG. 4 is a stylized current and potential map which illustrates the uniform distribution of electric field lines established by the current distribution and collection means across one field of the conductive surface of the touch sensitive position sensor.

As mentioned hereinabove, the alternating electrical fields so established are distributed in the manner shown in FIG. 4. In FIG. 4, the equipotential lines E are substantially parallel. It is necessary to obtain this high degree of field line parallelism and orthogonality in order to provide an electric field of sufficient linearity and uniformity for determining the precise location of the x-y position of data input upon the touch sensitive position sensor.

The high uniformity required for high resolution determination of the touch point location (3) requires one or more of highly uniform diode structure, a high resistance surface 121, or the reduction of "bulk resistance" effects in the distributed diodes. Thus, it is possible to increase the resistivity of the touch sensor-display surface 121 of the sensor 111 so as to insure that the diodes disposed on the touch sensor-display surface 121 will all operate below the onset of bulk limited behavior. The resistance of the display surface 121 may easily be increased, for example, by increasing the amount of oxygen present in it, thereby making it more glass-like, and therefore more insulative. A preferred value for resistance of the conductive surface 121 of the position sensor 111 is a resistance within the range of 20 to 5000 ohms per square, and preferably within the range of 100 to 300 ohms per square.

Figure 7A:
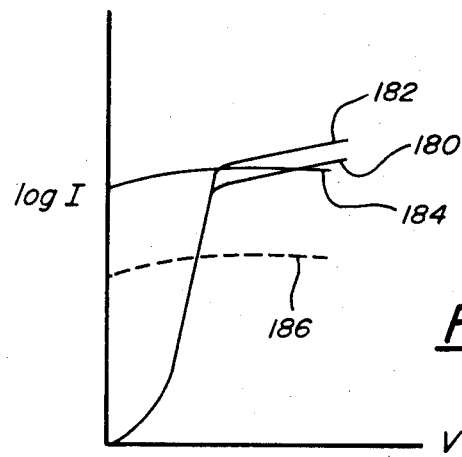
FIGS. 7A and 7B illustrate a pair of I-V curves which are characteristic of distributed diodes of the type employed in the position sensor described herein; specifically, the charts illustrate means by which to avoid "downstream" correlation errors by increasing the resistivity of the conductive surface of the position sensor as shown in FIG. 7A or by changing the I-V curve characteristic of the diode as shown in FIG. 7B.

Turning to FIG. 7A illustrates the I–V curve of two similar diodes 180 and 182. The difference in I–V characteristic observed for diodes 180 and 182 is attributable to minor thickness variations (i.e., greater than 1% and less than 5%) in the fabrication of the diodes. The resistance of the conductive surface 121, to which the diodes 180 and 182 are associated, is represented by line 184. Line 184 passes through the linear portion of diode 182's I–V curve, and through the bulk limited region of diode 180. This lack of uniformity of diode I–V characteristic results in the resolution problems discussed hereinabove. However, solved by increasing the resistance of the conductive surface, as indicated by line 186 (in phantom) so that less current flows across the conductive surface and therefore substantially all diodes associated with the conductive surface are operating in the linear portion of their characteristic I–V curve.

Figure 7B:
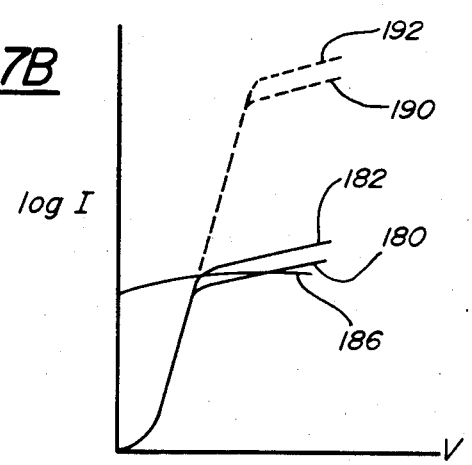

Alternatively or additionally a second method by which to relieve the problems of low resolution associated with the operation of the distributed p-i-n diodes in the bulk limited region, requires that diode thickness, which is typically in the range of 500 to 15,000 angstroms, be reduced e.g., by approximately one half, with substantially all of the reduction in thickness taken from the intrinsic region. Reducing the thickness of the intrinsic region curves, the onset of bulk limited behavior to occur at higher voltage levels, thereby allowing for greater field uniformity. FIG. 7B illustrates the characteristic I–V curve for four p-i-n (or n-i-p) diodes, 180, 182, 190 and 192. Diodes 190 and 192 are fabricated with intrinsic layers substantially thinner (i.e., 50% thinner) than the intrinsic layers found in diodes 180 and 182 intrinsic layers, thus resulting in I–V curves characterized by substantially longer linear regions. This results in a characteristic load resistance for a conductive surface 121, as illustrated by line 186 which will pass through the linear portion of a diode's characteristic I–V curve, as diode 190 or 192's characteristic curve, thereby eliminating the above discussed problems associated with diode non-uniformity.

Figure 8:
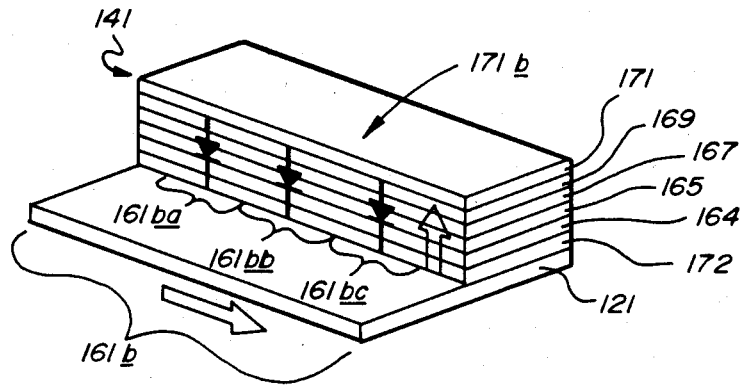
FIG. 8 is a perspective view, partially in cross-section, illustrating a preferred embodiment of an elongated, solid state diode current distribution (or collection) means which is utilized to linearize the distribution of electric field lines across the conductive surface of the touch sensitive position sensor of the instant invention.

The current distribution and collection means 141 may be formed as an off-stoichiometric silicon nitride switch, specifically adapted to prevent the deleterious effects of electrostatic discharge. Alternatively, the current distribution and collection means 141 may be formed as an elongated, distributed diode 161b, which distributed diode is shown in FIG. 8. Such an elongated distributed diode 161b is preferably formed by a plurality of superposed, continuous thin film layers of semiconductor alloy material deposited upon a common substrate 164 of, for example stainless steel. More particularly, the distributed diode may be affixed directly to one boundary of the conductive surface 121 of the position sensor 111, as by an electrically conductive adhesive layer 172. The diode affixed to the first boundary includes consecutively a substrate 164 upon which there is successively deposited: a layer of p-type amorphous silicon alloy material 165, a layer of substantially intrinsic silicon alloy material 167, an n-type layer of amorphous silicon alloy material 169 and a layer of a thin film, electrically conductive oxide material 171. On the opposite boundary of the conductive surface 121 of the sensor, the distributed diode will also be affixed, but the layers of semiconductor material will be deposited in reverse order. Specifically, upon the substrate 164 there is successively deposited a layer of n-type amorphous silicon alloy, a layer of intrinsic semiconductor alloy material, a layer of p-type semiconductor material and a layer of thin film conductive oxide material, (this reverse embodiment is not illustrated). It should be appreciated that in this manner, one bounded surface will have an elongated, distributed P-I-N diode disposed therealong while the opposite bounded surface will have an elongated, distributed N-I-P diode disposed therealong. With this arrangement, one set of the opposed elongated diodes can be forward biased to provide for unidirectional current flow across the conductive surface and the other set of opposed elongated diodes can be reverse biased to prevent the current flow across the conductive surface.

An example of the conductive oxide material employed herein is indium tin oxide, the sheet resistance of which can be tailored relative to the sheet resistance of the electrically conductive surface 121 of the touch position sensor 111 so as to provide relatively high lateral resistivity along the length of the diode, and so as to provide for uniform diode performance. The total thickness of the single or tandem PIN diode structure is only about 500–15,000 angstroms and preferably 1,000 to 8,000 angstroms, and may also be tailored to provide for uniform diode I-V characteristics. Further, due to its lateral resistivity, the single, elongated, distributed diode may be regarded as a plurality of discrete diode structures, such as 161*ba*, 163*bb*, 161*bc*, . . . 161*bz*. The horizontal separation between each of these discrete diodes is great enough to provide a sufficiently high impedance to current flow therebetween so that the current distribution and collection means 161*b* will exhibit preferential current conduction through the bulk of the distributor (in a path taken perpendicular to the conductive surface 121 of the sensor 111). The lateral resistivity of the conductive oxide must be high enough so that when that diode structure is not in an engaged, conductive or "on" mode, the conductive oxide does not distort the field flowing perpendicular thereto. It is important to note, diodes of the type described hereinabove may be patterned by standard etch techniques so as to form, for example, a plurality of individual diodes. Alternatively, the conductive oxide surface above may be patterned to affect electrical communication with adjacent structures.

Figure 9:
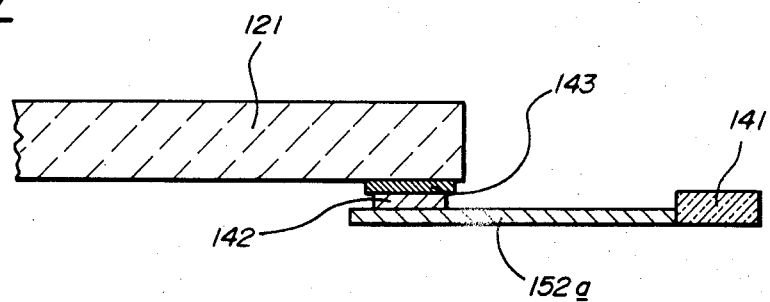
FIG. 9 is a perspective view, in cross section of the touch sensitive position sensor, wherein a resistance means is disposed upon said current distribution and collection means, and attached to said conductive surface by a layer of electrically conductive adhesive.

Turning now to FIG. 9, there is illustrated therein a cross-sectional view of the attachment of the current distribution and collection means 141 with said resistance means 142 to the conductive surface 121. Specifically, disposed upon current lead 152*a*, of current distribution means 141 is a resistance means 142, which may be for example, a discrete thick film resistor screened or printed thereupon. The resistance means 142 and current lead 152*a* are then attached to the conductive surface 121 by means of a layer of electrically conductive adhesive 143. Specifically, the adhesive must be electrically conductive in a first direction and electrically resistive in at least a second direction perpendicular to the path of electrical conductivity. A material particularly adapted to this function is manufactured by Uniax under the trademark "UNIAXIAL CONDUCTIVE ADHESIVE". A second material manufactured by 3M Corporation and known as 9702 Conductive Adhesive Tape may also be employed.

Alternatively, the distributed diodes described hereinabove may be placed in electrical communication with the surface of the touch sensor 111. In a preferred embodiment, the material utilized for such a function is fabricated from a thin layer of an electrically resistive polymeric matrix material having thin electrically conductive carbon lines printed thereupon. Particularly well suited materials for this function are sold by Chinitsu under the trademark "E L FORM". "E L FORM" matrix is also adapted to function as the resistance means in that the "E L FORM" matrix possesses an inherent electrical resistance of approximately 90 ohms, a resistance sufficient to enhance and promote field uniformity and linearity. It is understood however, that other connection means (with or without associated resistance means) may be equivalently employed. It is to be noted that the current distribution and collection means provides a rectifying junction at each contact point. This can be accomplished by depositing a PIN diode structure on one rectangularly-shaped sheet of substrate material and depositing a NIP diode structure on a second rectangularly-shaped sheet of substrate material. The conductive oxide layer of the PIN diode structure is electrically connected to the conductive lines of the "E L FORM" matrix, said "E L FORM" matrix being affixed to one boundary of the sensor 11; while the conductive oxide layer of the NIP diode structure is electrically connected to the conductive lines of "E L FORM" matrix at the opposite boundary of the sensor. In this manner, current can flow across the conductive surface 111, but the adjacent diodes (equal in number to the number of current leads) are unable to cross-talk. It must be emphasized that only thin film deposited semiconductor technology can provide for this type of elongated distributed diode structure wherein diodes of opposite polarities are affixed to opposite boundaries of the sensor 111.

A further advantage realized by employing thin film semiconductor technology is that diodes deposited as continuous thin film layers of semiconductor alloy material are manufactured with substantial uniformity. The uniformity arises from the fabrication of an elongated strip of distributed diode material in a continuous process, under uniform deposition conditions and utilizing substantially identical precursors. This elongated strip of multilayered, thin film semiconductor alloy material can then be cut into smaller strips of a desired size and shape.

The touch sensitive position sensor 111 of the instant invention includes means for generating an electrical signal which is indicative of the X-Y location of the touch point 131. For example, a pixel or picture element may be addressed in either vector or matrix coordinates; and a contents code, e.g., a contents code for binary data, or a contents code word indicative of analog data, such as color, pitch, hue, gray scale or the like, generated.

The erasure of data inputted onto the conductive surface of the position sensor may be handled in a manner analogous to the entry of colored data. More particularly, the erasure means is adapted to generate a unique signal so as to provide a signal of varying strength or frequency. This frequency is readily sensed by the downstream processing apparatus as relating to the erasure, vis-a-vis, the entry, of data and the digital data is removed from memory.

3. Display

The paperless facsimile means of the invention includes means of displaying the image data entered on the touch position sensor 111 and received from remote data entry points. The display means is a light influencing display, and preaerably an active matrix light influencing display.

The light influencing display 210 has a plurality of individually addressable picture elements, called pixels. Each pixel has a separate pair of opposing pixel electrodes, with light influencing material between them. Voltages are selectively applied to the electrode pairs, causing the light influencing material between the electrode to emit light or to change optical density. These opposing pixel electrodes may be located on opposing substrates, such as opposing glass pates, with the light influencing material, such as liquid crystal material, located between the substrates. Alternatively, the electrodes may be on the same plate, with the liquid crystal material above or below them.

In displays with many pixels it is necessary to use x-y matrix addressing. In x-y matrix addressing all of the "first" pixel electrodes of a given row are connected to an address line associated with that row and all the "second" pixel electrodes of a given column are connected to an address line associated with that column. This enables each pixel to be address by selecting its associated x and y address lines.

In relatively small x-y light influencing displays, passive matrix switching is used. In passive matrix switching each of the x and y lines is usually directly connected, without intervening electronic devices, to the pixel electrodes in its associated row or column. In sequential scanning the pixels of a passive matrix array are driven sequentially in a scanning process in which each row is selected successively, and, during the selection of each row, each column is selected successively. This causes each of the pixels of each row to be scanned in sequential order. During the time allotted for the selection of each pixel the circuitry decides whether that pixel is to be turned on or off by controlling the amplitude of the voltage applied across the pixel. In parallel scanned passive arrays each of the rows is selected in succession, and during the selection of a row all of the column lines are driven in parallel with individually selected voltages, turning each pixel in the row to a desired state, either "on" or "off". Such passive matrix multiplexing scanning schemes in which the pixels are driven directly by their x and y address lines without intervening electronic devices work well for relatively small arrays. But as array size grows, the amount of time for the application of a voltage to a given pixel, or row of pixels, decreases. As a result, the percentage of time during each scanning cycle that a given pixel has a voltage applied across it decreases, thereby decreasing the average contrast between its "on" state and its "off" state. For this reason large passive matrix multiplexed displays tend to produce images with poor contrast, making such displays difficult to read.

One way of overcoming this limitation which we prefer in the paperless facsimile means of the teleconferencing system is to use active display matrixes instead of passive displays. In active display matrices each of the pixels has associated with it a non-linear electronic device which acts as a switch. This switch enables current to flow to or from the pixel during the brief period when the pixel is selected, enabling the pixel to rapidly change state from "off" to "on", or vice versa, but the switch prevents current flow to or from the pixel when the pixel is not selected. In this way the charge placed on the pixel during its brief selection period is substantially maintained during the rest of the scanning cycle. As a result, the pixel tends to maintain its "on" or its "off" state during the entire scanning cycle, greatly increasing the contrast and readability of the display.

The non-linear device that is the switch, may be a two-terminal device, as a diode, or a three-terminal device, as a transistor.

a. Display Element With Two-Terminal Control Devices

A two-terminal control device is one that has two current path electrodes and a junction therebetween. The junction has a barrier height which allows current flow in one direction but blocks current flow in an opposite direction.

Figure 10:
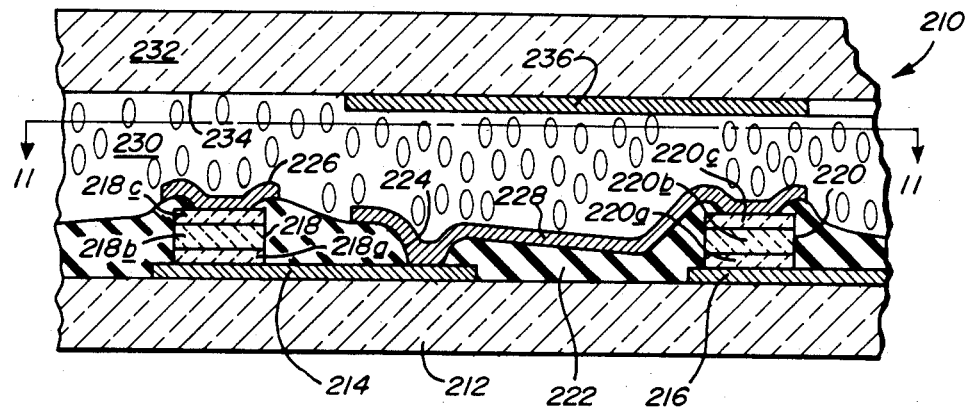
FIG. 10 is a cross-sectional side view of a liquid crystal display pixel.
Figure 11:
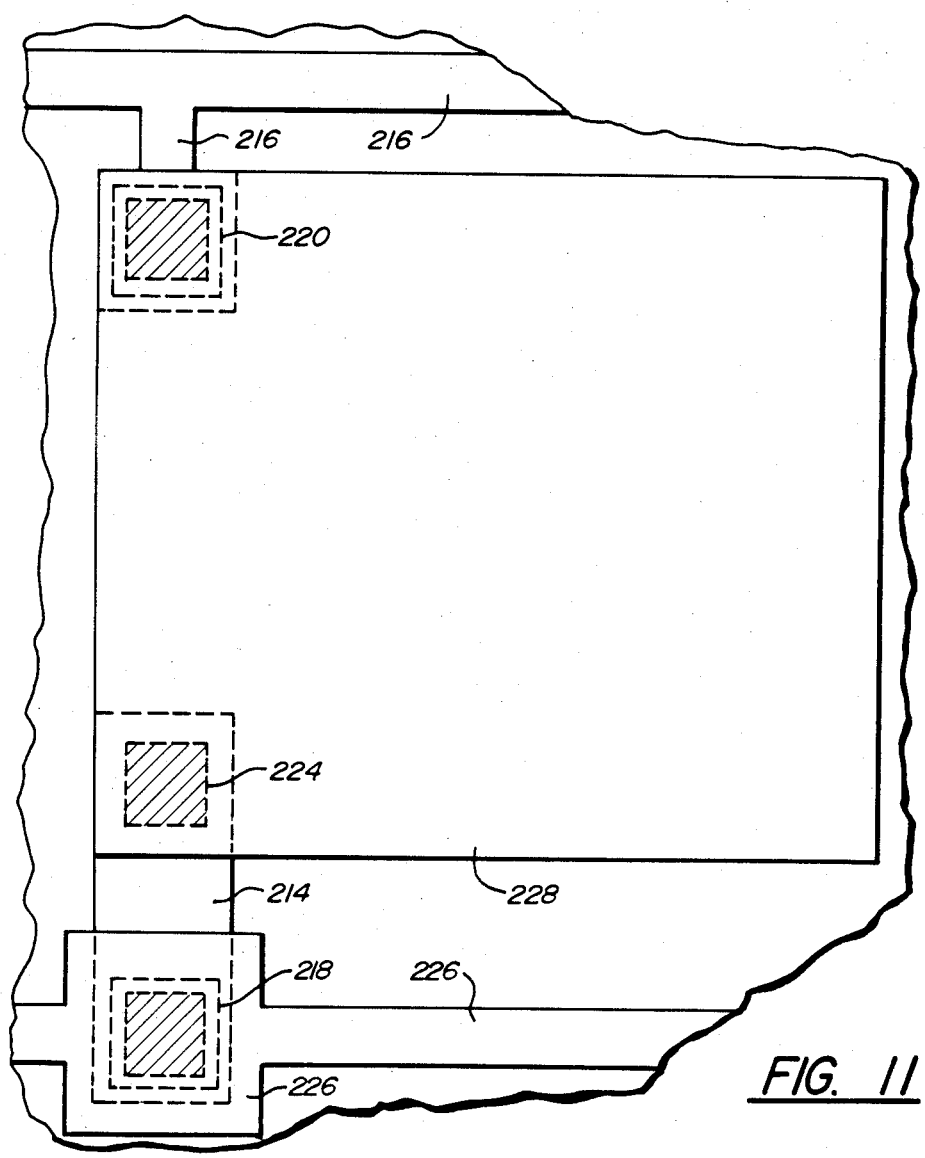
FIG. 11 is a top plan view as seen along lines 11—11 of FIG. 10.

FIGS. 10 and 11 illustrate a display pixel 210. Although just one display pixel 210 is illustrated, it can be appreciated that many such pixels arrayed in row and column arrangement are necessary to provide a complete liquid crystal display.

The display pixel 210 includes an insulative substrate 212 which can be formed from glass, for example. Formed on the substrate 212 is an interconnect bus or lead 214 and a first address lead 216. The interconnect lead 214 and first address lead 216 can be formed from a conductive material such as a metal, for example, aluminum, molybdenum, or a molybdenum tantalum alloy, chromium, tantalum tungsten, palladium or platinum.

The display pixel 210 further includes a pair of diodes 218 and 220 formed on the interconnect leads 214 and first address lead 216, respectively. The diodes 218 and 220 are preferably formed from a deposited semiconductor material. The deposited semiconductor material is preferably an amorphous semiconductor alloy including silicon. The amorphous silicon alloy can also include hydrogen and/or fluorine and can be deposited by plasma assisted chemical vapor deposition, i.e. glow discharge. The diodes 218 and 220 preferably have a p-i-n configuration formed by a first doped region 218a and 220a, which can be p-type, an intrinsic region 218b and 220b overlying the first doped regions 218a and 220a respectively, and a second doped region 218c and 220c, which an be n-type, overlying the intrinsic regions 218b and 220b respectively.

The display pixel 210 further includes a second address lead 226 in electrical contact with the n-type region 218c of diode 218 and a first electrode 228 which is in electrical connection with the interconnect lead 214 through the opening 224 and the n-type region 220c of diode 220.

The address leads 216, 226 are formed of deposited metal essentially parallel to one another, as can be seen from FIG. 11, and both are coupled to the first electrodes 228. The diodes 218, 220 form an isolator coupled to the first electrode 228. The isolator formed of the diodes 218, 220 has first and second inputs to which the address line 226, 216 respectively are coupled.

The first electrode 228 can be configured in a square configuration as illustrated in FIG. 11 and can be, for example, 300 microns to 2,000 microns on a side depending on the overall size of the finished display matrix and the desired aspect ratio.

With the first electrode 228 contacting the interconnect lead 214 through the opening 224, the diodes 218 and 220 are connected together in series relation. As shown in FIG. 10, the address lead 216 and 226 are only in electrical connection with the first electrode 228 through the diodes 218 and 220.

Overlying the resulting structure described above, is a layer of light influencing material 230.

The display pixel 210 further includes a top transparent insulative plate 232 formed from, for example, glass. On the inner surface 234 of the insulative plate 232 is a layer of transparent conductive material 236 which can be, for example, indium tin oxide. The indium tin oxide layer 236 forms a second electrode of the display pixel 210. This electrode 236 is in contact with the liquid crystal material 230. The second electrode 236 is configured to have the same dimension as the first electrode 228 and is aligned therewith. The top insulative plate 232 is polarized in a manner well known in the art consistent with the type of liquid crystal display material (light influence material 230) utilized in the display pixel 210. An alignment coating of a conventional type can be applied over the first electrode 228 for the purpose of aligning molecules in the liquid crystal display material 230.

Figure 12:
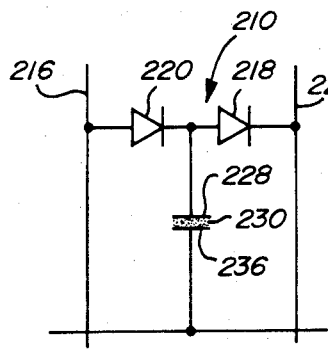
FIG. 12 is a schematic circuit diagram illustrating the equivalent circuit of the liquid crystal display pixel of FIG. 10.

FIG. 12 illustrates the equivalent circuit diagram of the pixel 210 of FIG. 10. The pixel 210 includes the address leads 216 and 226, a pair of series connected diodes 218 and 220 coupled between the address leads 216 and 226, and the first conductive electrode 228 coupled between the diodes. The pixel 210 further includes the second electrode 236 spaced from the first electrode 228. In between the electrodes 228 and 236 is the liquid display material 230.

The useful life of a nematic liquid crystal display can be extended if the polarity of the applied voltage potential is reversed during alternate frames or scans. This can be accomplished with the pixel 210 of FIG. 10 by impressing a positive potential onto first address leads 216 and a negative potential onto the second electrode 236 during one frame to forward bias diode 220 and by impressing a negative potential onto the second address lead 226 and a positive potential on the second electrode 236 during the next frame. Repeating this sequence causes the potential applied to the liquid crystal display material to be reversed during alternate frames.

Figure 13:
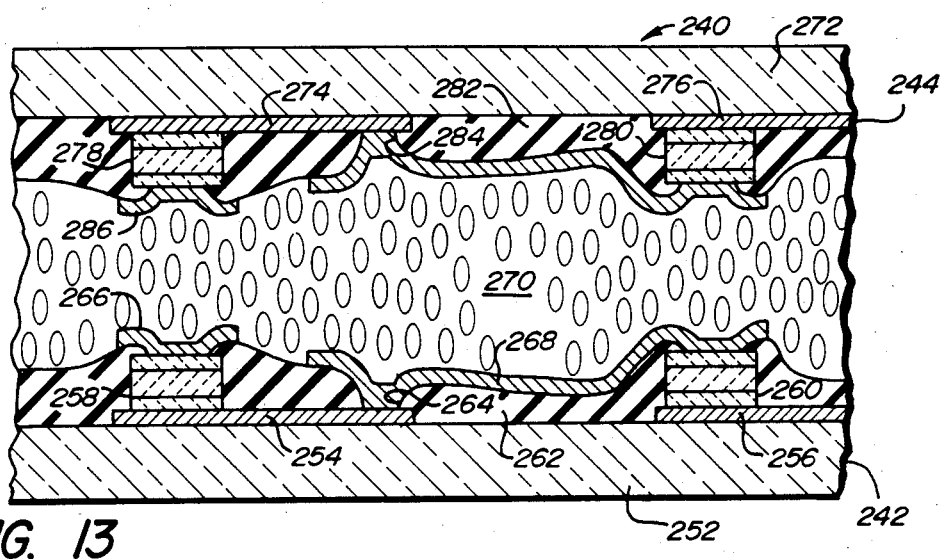
FIG. 13 is a cross-sectional side view of another liquid crystal display pixel.

FIG. 13 illustrates another liquid crystal display pixel 240. The pixel 240 includes two pairs of diodes and is formed by first and second subassemblies 242 and 244 respectively.

Each of the subassemblies 242 and 244 are substantially identical to the portion of the liquid crystal display pixels 210 of FIG. 10 beneath the liquid crystal display material 230.

The first subassembly 242 includes an insulative substrate 252 which can be formed from, for example, glass. The first subassembly 242 further includes an interconnect lead 254, a first address lead 256, and a first pair of diodes 258 and 260 which can be substantially identical to the p-i-n diodes 218 and 220 of pixel 210. Between the diodes 258 and 260 and defining an opening 264 communicating with the interconnect lead 254 is a layer of insulative material 262 which can be a polyimide, for example. The first subassembly 242 further includes a second address lead 266 and a first electrode 268.

The second subassembly 244 also includes an insulative substrate 272, and interconnect leads 274, a first address lead 276, a second pair of diodes 278 and 280, an insulating layer 282 defining an opening 284 communicating with interconnect lead 274, a second address lead 286, and a second electrode 288. If the liquid crystal display material 270 between the subassemblies 242 and 244 is to be viewed through the second subassembly 244, then the second electrode 288 should be formed from a transparent conductive material, such as, for example, indium tin oxide, and the insulative substrate 272 should be formed from a transparent material such as glass which is polarized in a manner consistent with the liquid crystal display material 270 utilized between the subassemblies. It will be understood that conventional molecular alignment coatings and polarizers will be incorporated into the subassemblies, such as 242 and 244, disclosed herein as would be known to those of skill in the art.

Figure 14:
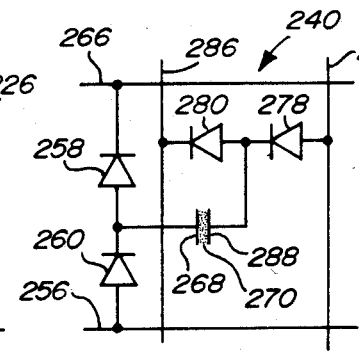
FIG. 14 is a schematic circuit diagram illustrating the equivalent circuit of the liquid crystal display pixel of FIG. 13.

FIG. 14 illustrates the equivalent circuit diagram of the pixel 240 of FIG. 13. The pixel 240 includes a first pair of diodes 258 and 260 and a second pair of diodes 278 and 280. Each pair of diodes is coupled in series relation. The pixel 240 further includes a first pair of address leads 256 and 266 coupled to the respectively ends of the series coupled diodes 258 and 260 and a second pair of address lead 276 and 286 coupled to respective ends of the other pair of series coupled diodes 278 and 280. The first electrode 268 is coupled to the junction of the diodes 258 and 260 and the second electrode 288 is coupled to the junction of the diodes 278 and 280. Liquid crystal display material 270 is disposed between the electrodes 268 and 288.

The potential applied to the liquid crystal material 270 can be reversed during alternate frames. During one frame, a positive potential can be applied to address lead 276 and a negative potential to address lead 266. During alternate frames, a positive potential can be applied to address lead 256, and a negative potential to address lead 286. In this manner, the potential applied to the liquid crystal material 270 can be reversed during alternate frames.

Figure 15:
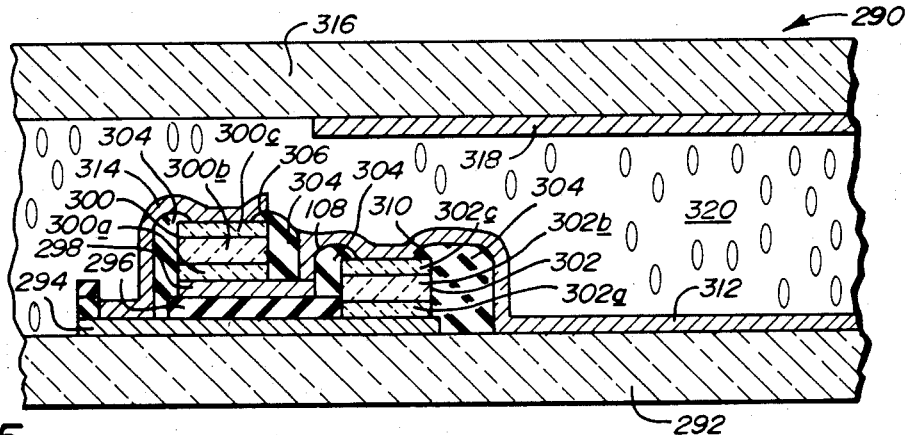
FIG. 15 is a cross-sectional side view of another liquid crystal display pixel.

FIG. 15 illustrates a further liquid crystal display pixel 290. The pixel 290 is formed on an insulative substrate 292, such as glass, for example. Formed on the glass substrate 292 is a first address lead 294. The first address lead 294 can be formed from a conductive metal as in the previous embodiments and can be, for example, aluminum, molybdenum, or molybdenum tantalum alloy, chromium, tantalum tungsten, palladium, or platinum.

The pixel 290 further includes insulating layer 296 and insulating portions 304. The insulating layer 296 and portions 304 can be formed from any deposited insulator such as silicon oxide or silicon nitride. The insulating layer 296 has openings 306, 308, and 310 therein to expose surface portions of the n-type regions of the diodes 300 and 302 and a surface portion of the first interconnect lead 298.

The pixel 290 further includes a bottom electrode 312 and a second interconnect lead 314.

FIG. 15 further shows that the second interconnect lead 314 contacts the address lead 294 and the n-type region 300c of diode 300 through the opening 306 of the insulating portions 304. The bottom electrode 312 contacts the first interconnect lead 298 through the opening 308 and the n-type region 302c of diode 302 through the opening 310. The anode of diode 302 is coupled to the cathode of diode 300 and the anode of diode 300 is coupled to the cathode of diode 302. Also, the joint connection between the anode of diode 300 and the cathode of diode 302 is coupled to the first or bottom electrode 312.

The pixel 290 further includes an insulative transparent plate 316 which has a transparent conductive material 318 deposited on its inner surface to form the second electrode of the pixel 290. The transparent conductor 318 is configured to have the same dimensions as the effective dimensions of the bottom electrode 312 and is aligned therewith. Disposed between at least the electrodes 312 and 318, and in contact therewith, is liquid crystal display material 320, which can be, for example, nematic liquid crystal material of the type well known in the art. The top transparent plate 316 as well as the lower plate 292 can be, as in the previous embodiments, polarized in a manner consistent with the type of liquid crystal display material 320 utilized in the display.

Figure 16:
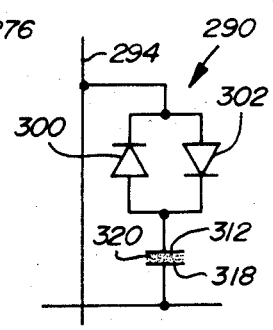
FIG. 16 is a schematic circuit diagram illustrating the equivalent circuit of the liquid crystal display pixel of FIG. 14.

FIG. 16 illustrates the equivalent circuit diagram of the liquid crystal display pixel 290 of FIG. 15. The pixel 290 includes the pair of diodes 300 and 302 with the cathode of diode 300 and the anode of diode 302 coupled together and also coupled to the first address lead 294. The anode of diode 300 and the cathode of diode 302 are also coupled together and to the first electrode 312. The second electrode 318 is coupled to a second address lead 322 (not shown in FIG. 15) and the liquid crystal display material 320 is disposed between and in electrical contact with at least the electrodes 312 and 318.

The potential applied to the liquid crystal material 320 can be reversed during alternate frames. During one frame, a positive potential can be applied to first address lead 394 and a negative potential to second address lead 322. During alternate frames, a positive potential can be applied to second address lead 322, and a negative potential to first address lead 294. In this manner, the potential applied to the liquid crystal material 220 can be reversed during alternate frames.

Figure 17:
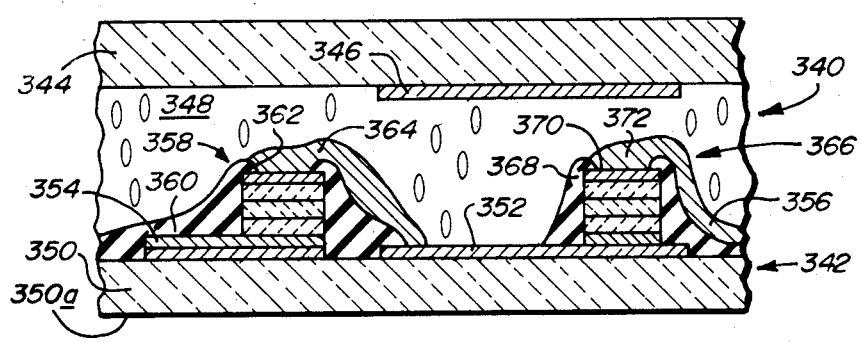
FIG. 17 is a cross-sectional side view of an alternative liquid crystal display pixel.

FIG. 17 illustrates a further alternative display useful in the present invention. A single pixel 340 of a display which incorporates a subassembly 342 is illustrated in FIG. 17. Spaced apart from the subassembly 342 is an insulating transparent substrate 344 which can be formed of glass and upon which is formed a pixel electrode 346. The pixel electrode 346 may be formed of transparent indium tin oxide. Between the substrate 344, the pixel electrode 346 and the subassembly 342 is a region 348 which is filled with a light influencing material. For example, nematic liquid crystal material of a conventional type may be used.

The subassembly 342 includes an insulating substrate 350, such as glass, upon which is formed a pixel electrode 352. The subassembly 342 also includes a first address line 354 formed on the insulating substrate 350 and a second address line 356 insulated from the first address line 354 and carried by the insulating substrate 350. An isolation device 358, preferably a p-i-n diode, is formed on a region of the first address line 354. A silicon dioxide layer 360, or equivalent insulator as previously disclosed, surrounds the diode 358 and covers the first address line 354 except in a region or via 362. A metal deposit 364 extends through the via 362 and is in contact with the isolation device 358. The metal deposit 364 couples the isolation device 358 to the pixel electrode 352.

A second isolation device 366, also preferably a p-i-n diode, is formed on a region of the pixel electrode 352. An insulating layer 368, such as silicon dioxide, surrounds and covers the isolation device 366 except in a region or via 370. A metal deposit 372 extends through the via 370 to contact the isolation device 366. The second address line 356 is preferably formed during the same processing step and at the same time as the metal deposit 372. To simultaneously form the second address line 356 and metal deposit 372, a layer of metal can be deposited over the insulating layer 368. The metal layer is then etched away in a conventional fashion to form the deposit 372 and the second address line 356. Alternately, the second address line 356 could be formed before or after the metal deposit 372. The metal deposit 372 couples the isolation device 366 between the pixel electrode 352 and the second address line 356. The second address line 356 is deposited on a region of the insulating layer 368. The equivalent circuit of FIG. 12 applies to the liquid crystal display 340 of FIG. 17.

The address lines 354, 356 are formed with no crossovers as were the address lines 216,226. The address lines 354,356 are each coupled to the pixel electrode 352.

b. Display Element With Three-Terminal Control Devices

Alternatively, the active matrix may have three-terminal non-linear control devices.

A three-terminal control device is one hat has two current path electrodes and a control electrode, with the effective resistance between the two current path electrodes being controlled as a function of a signal supplied to the control electrode. For example, in the thin film field effect transistors often used in active matrix displays, the voltage applied to the gate electrode controls the amount of current which flows between the source and drain electrode of the transistor.

Pixel electrodes of one polarity, the associated X and Y address lines, and the associated three-terminal devices are deposited on one substrate of the display. Each of the three-terminal devices has one of its current path electrodes connected to pixel electrode of the associated pixel. The X and Y lines are on the substrate to enable each three-terminal device and its associated pixel to be individually addressed. One of the sets of the address lines, for example, the X address lines, are connected to the control electrodes of the three terminal devices, with an X address line being connected to all of the control electrodes (gate) in one row of pixels. Correspondingly, the other set of address lines, for example, the y address lines, are connected to one of the current path electrodes (source or drain) of the control devices, with a Y address line being connected to a current path electrode (source or drain) of each pixel in one column of pixels. The pixel electrodes on the opposite substrate are usually connected to a common voltage, such as ground.

An individual pixel is switched by applying a voltage above a threshold voltage across the liquid crystal material of the pixel. This is accomplished by applying a potential, i.e., a gate voltage, to the X address line connected to the control electrode of a three-terminal device and simultaneously applying a potential, i.e., a drain potential, across the Y address line connected to the current path electrode of the three-terminal device. For example, when the three-terminal devices are thin film field effect transistors, the gate of each transistor is connected to an X address line and the source of each transistor is connected to a Y address line. In a field effect transistor, the pixel is switched, i.e., structure, a selected is turned on or off by applying the appropriate voltages between to the X address line connected to its gate and the Y address line connected to its source.

A typical light influencing display, useful in providing the display of the integral, modular, input and display and the mode of operation of the display are shown in FIGS. 18 through 25.

Figure 18:
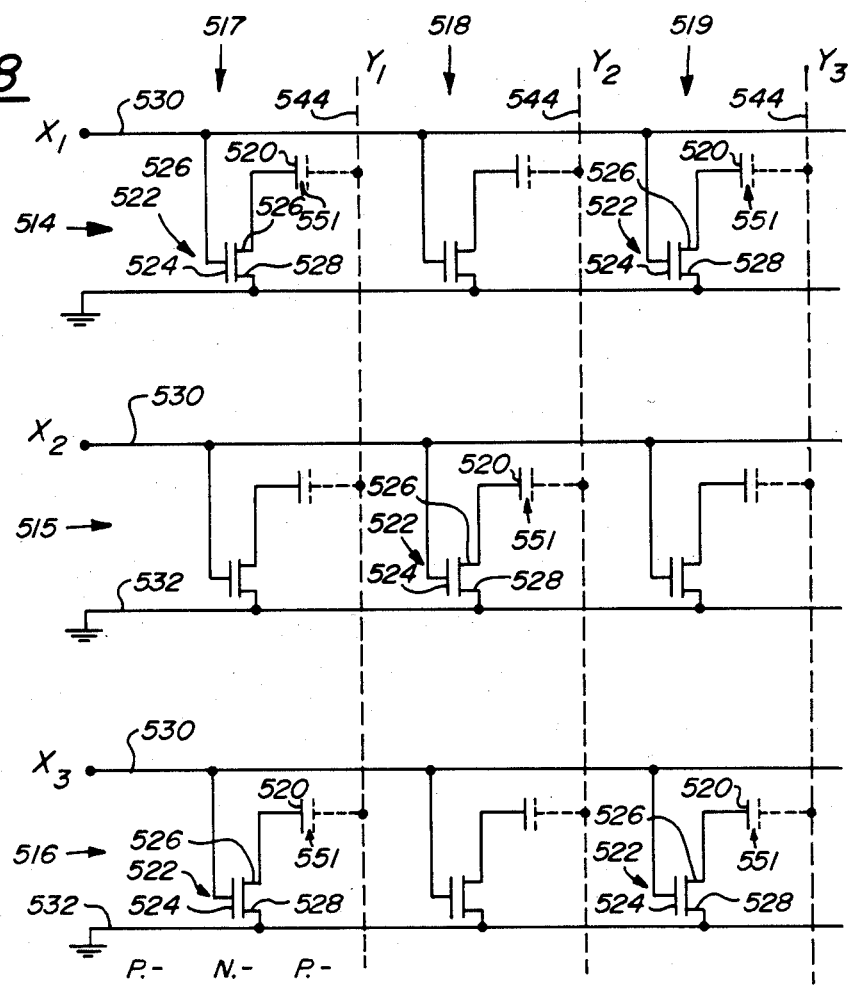
FIG. 18 is an electrical schematic diagram of the electrical circuitry of a liquid crystal display matrix with three terminal control devices.

FIG. 18 shows a schematic diagram of a 3×3 pixel array. The circuit elements formed on the bottom substrate are shown by solid lines and the circuit elements formed by the strip conductors 544 on the upper substrate 542 are shown by dotted lines. The gates 524 of the transistors are connected to the x address lines 530 while the drains 526 are connected to the y address lines 544 through the pixel electrodes 520 and pixel 551. The sources 528 of all of the transistors 522 are connected to ground through the second conductive leads 532.

Figure 19:
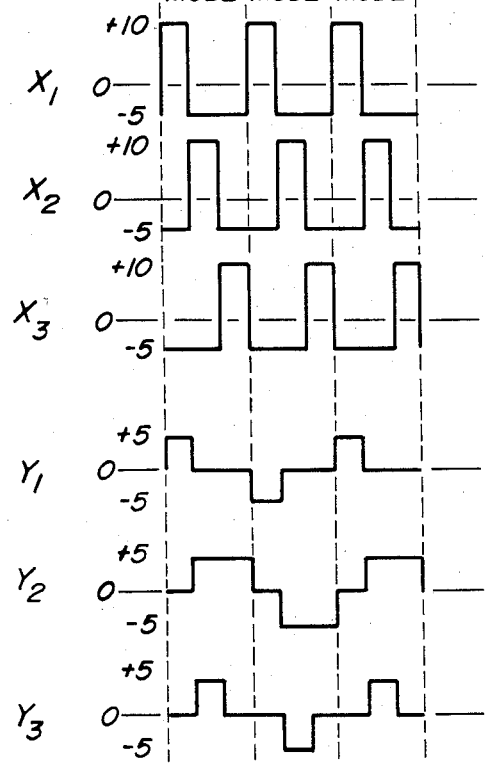
FIG. 19 is a set of wave diagrams showing the voltages supplied to the X and Y lines of the embodiment of the invention shown in FIG. 18.
Figure 20:
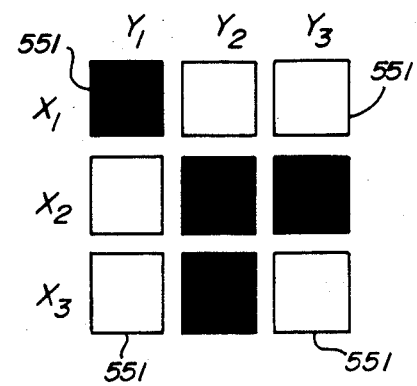
FIG. 20 is a schematic representation of the distribution of "on" and "off" pixels which result when the embodiment of the invention shown in FIG. 18 is supplied with the wave forms shown in FIG. 19.

FIG. 19 shows the voltage waveforms applied to the circuit shown in FIG. 18 to cause the individual pixels to form the pattern shown in FIG. 20. For purposes of illustration only, the pixels 551 are light transmissive unless a voltage is applied across them. When a voltage is applied across a pixel, the pixel becomes light blocking or dark. The waveforms $X_1$, $X_2$, and $X_3$ are voltage waveforms which are supplied through the control leads 530 to the gates 524 of the transistors in the rows 514, 515 or 516, respectively. Similarly the waveforms $Y_1$, $Y_2$ and $Y_3$ are voltages applied through strip conductors 544, which function as data leads, to the pixels 551 in the columns 517, 518 and 519, respectively. The Y voltages are applied through the pixels to the drains 526 of the transistors 522. The source electrodes 528 of all the transistors 522 are connected through the voltage supply leads 532 to ground.

In operation, each of the transistors 522 in a given row 514, 515, or 516 is turned on when its respective X address line 530 is supplied with a positive "on" gate voltage, which for the TFTs of the illustrated embodiment is approximately 10 volts. Once the transistors 522 of a given row are turned on, the conductivity between the sources 528 and drains 526 of that row is greatly increased, effectively connecting the bottom pixel electrodes 520 of that row to ground. When a given row is selected in such a manner, a plurality of selected data voltages are applied in parallel to the second pixel electrodes of the row by means of the data leads, or Y lines 544. This causes each of the pixels 551 in the selected row to be charged to a voltage equal to the difference between the data voltage on its associated Y line and the ground voltage on its source line 532. For example, during the first third of each p-mode, when the address line $X_1$ is high, the Y address line $Y_1$ is supplied with an "on" data voltage of approximately +5 v olts, and the Y address lines $Y_2$ and $Y_3$ are supplied with "off" data voltages of zero volts. As a result, the left pixel of the top row is turned on, whereas the remaining two pixels of that row remain off. In the embodiments described in FIG. 20, the pixels which are turned on are made opaque or dark, and the pixels which are left off remain transparent or light. It is to be understood, however, that the circuitry is also applicable to displays which behave just the opposite, that is, in which pixels that have a voltage applied across them turn transparent and those without a voltage applied across them remain opaque.

During the period when the first row is selected and has its transistors turned on, the address lines $X_2$ and $X_3$, which are connected to the other non-selected pixel rows, are supplied with a negative potential of −5 v olts. This negative potential extends below ground by −5 v olts and insures that each of the transistors in non-selected rows remain off. In fact this voltage is sufficiently low to insure that the transistors in non-selected rows remain off, even when the voltage on their associated bottom pixels 520, which are connected to their drains 526, is less than ground by twice the "on" pixel voltage of 5 v olts. This is necessary for the following reason. If a given pixel is charged to +5 v olts when its row is selected by placing its bottom pixel electrode 520 at ground and its Y line at +5 v olts, this charge causes its bottom pixel electrode to remain 5 v olts below the voltage on its Y line for as long as that 5 v olt charge remains on the pixel. Since the leakage of charge across the pixel through the liquid crystal material, is relatively small during the period between the pixel's recharging, and since the transistor associated with the pixel is supposed to be turned off when its row is non-selected, a substantial portion of the +5 v olt charge remains on the pixel during the period when it is non-selected. Thus, if the Y line drops to zero volts during the selection of another row, the voltage on the pixel's bottom electrode 520 drops to approximately −5 v olts. Even more extreme, if during the n-mode, described below, the Y line drops to a minus "on" pixel voltage of −5 v olts, the bottom pixel electrode or the address line will drop to approximately −10 v olts. Because this large negative voltage is connected to the drain, the transistors in non-selected rows should be supplied with a negative gate voltage to insure that they remain off. Since the gate threshold voltage of the transistors of the preferred embodiment is more than 5 v olts, the "off" gate voltage of −5 v olts is sufficient to keep the non-selected transistors off even when the voltage on their drain reached −10 v olts.

In the second third of each p-mode period, the second X line, $X_2$ is supplied with a positive, or "on", gate voltage and all the other X lines are supplied with an "off" gate voltage of −5 v olts. As shown in FIG. 19, during this period the line $Y_1$ is held at zero volts and the lines $Y_2$ and $Y_3$ are supplied with "on" voltages of +5 v olts. Thus, as is show in FIG. 20, the first pixel in the row $X_2$ remains off, and thus transparent, whereas the second and third pixels in that row are turned on, and thus are light blocking. Similarly, during the last third of the p-modes, the last row $X_3$ has a positive "on" gate voltage supplied to its transistors, and the other rows have negative or "off" gate voltages supplied to their transistors. During this time, the line $Y_1$ is supplied with a zero "off" voltage, the line $Y_2$ is supplied with a positive "on" voltage and line $Y_3$ is supplied with a zero "off" voltage. Thus, the first and third transistors of that row remain off, and only the middle transistor of that row is turned on.

As stated above with respect to two-terminal devices, it is important to periodically reverse the polarity of the voltages applied across individual pixels. For this reason the voltage driving scheme used to power the display shown schematically in FIG. 18 is divided into alternating positive and negative modes, indicated by the labels p-mode and n-mode in FIG. 19. In this driving scheme the voltages applied through the X lines, $X_1$, $X_2$ and $X_3$ to the gates of the transistors 522 are the same during both the p and n modes. However, the polarity of the voltages applied to the Y lines, $Y_1$, $Y_2$ and $Y_3$ during the n-mode are reversed n polarity relative to those applied during the p-mode. Thus the voltages supplied to the X lines turn on the transistors of the display in the same manner during both the p-and n-modes, but during the n-mode the pixels 551 which are to be turned on are supplied with a negative "on" voltage of −5 volts, rather than a positive "on" voltage of +5 volts.

The devices alternate between the p-and n-modes at an acceptable frequency. Typically, the frequency is 60 times a second, the rate used to alternate between fields of a standard video signal. As a result, a pixel which is turned on has the polarity of the voltage applied across it rapidly alternated, preventing any net dc current flow through the liquid crystal material associated with the pixel. Furthermore, since the entire pixel array has each of its pixels rewritten, for example, 60 times a second, there is no perceived flicker on the display.

Figure 21:
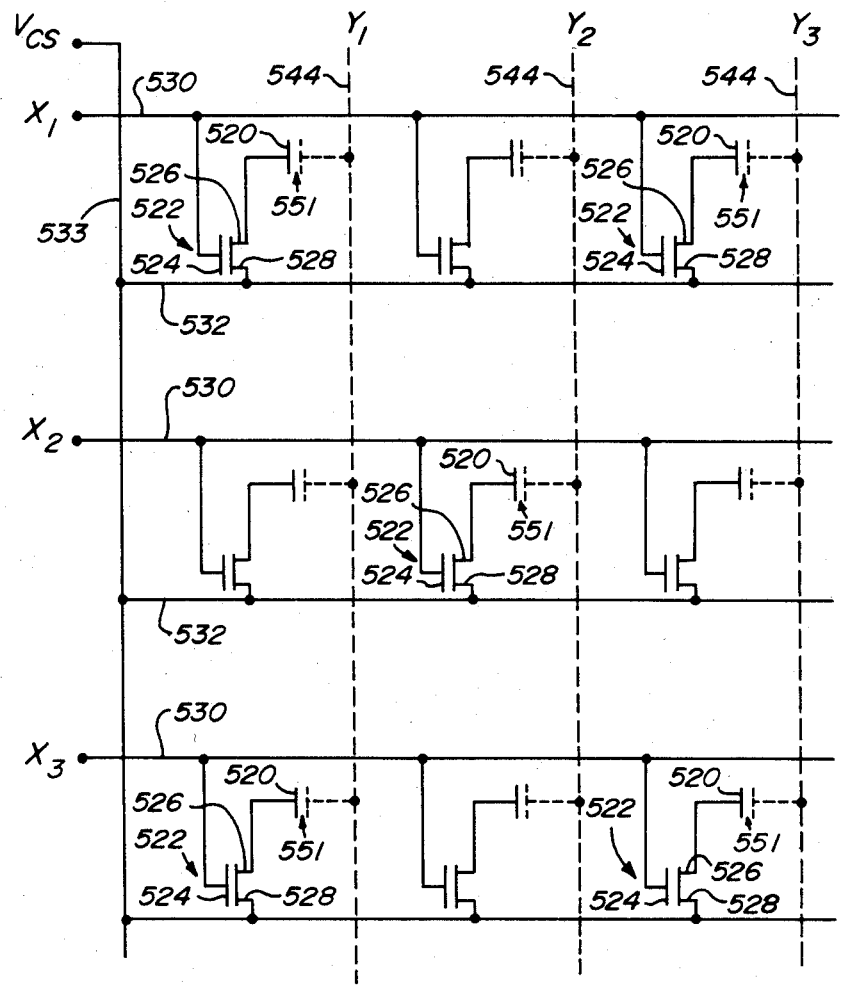
FIG. 21 is a schematic circuit diagram identical to that shown in FIG. 18 except that all the sources of its transistors, instead of being tied to ground as in FIG. 18, are tied to a common variable voltage source $V_{cs}$.
Figure 22:
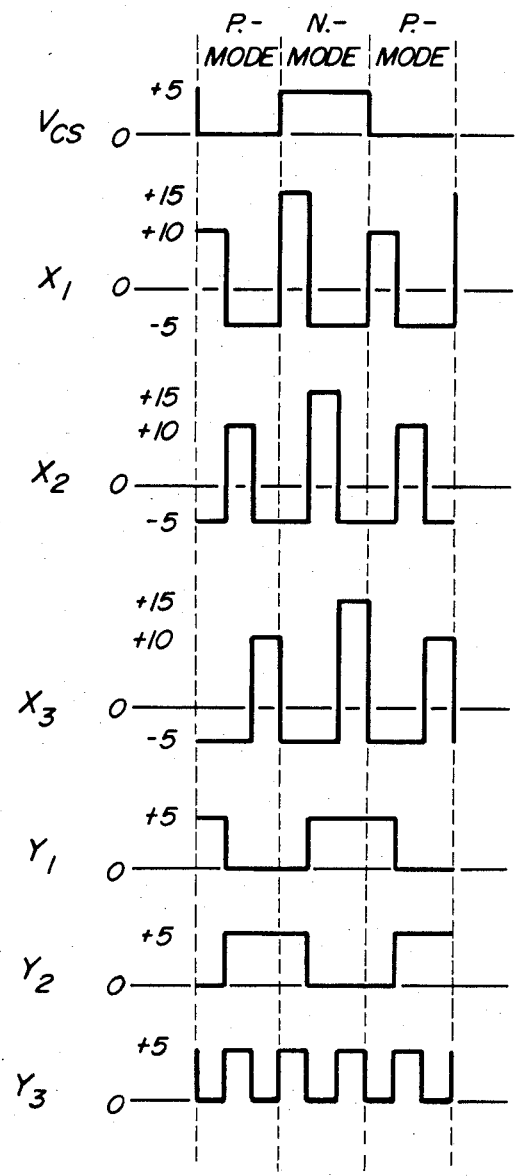
FIG. 22 is a set of wave diagrams showing the voltages supplied by the voltage supply $V_{cs}$ and to the x and y lines in FIG. 21 to produce the pixel pattern shown in FIG. 21.

FIG. 21 is a schematic diagram of an alternate active matrix display useful in the paperless facsimile of the invention. This embodiment is identical to that shown in FIG. 18, except that the sources 528 of all of its transistors are connected through voltage supply lines 532 and the common conductive lead 533 to a variable preselected voltage supplied by a common voltage supply $V_{cs}$. FIG. 22 shows the voltage waveforms used to drive the circuitry of FIG. 21 to produce the pixel pattern shown in FIG. 20. As is shown in FIG. 22, the output of the common voltage supply $V_{cs}$, which is connected to the sources of all the transistors 522, is repeatedly alternated between two voltages, a more negative voltage and a more positive voltage. The output of $V_{cs}$ is held to a more negative ground voltage during each p-mode and it is held to a more positive voltage of +5 volts during each n-mode.

During the p-mode the apparatus shown in FIG. 21 with the waveforms shown in FIG. 22 operate identically to the apparatus shown in FIG. 18 with the waveforms shown in FIG. 19. It is in the n-mode that the voltage driving scheme shown in FIG. 22 differs from that shown in FIG. 19. As described above, the voltage driving scheme shown in FIG. 19 reverses the voltage polarity across the pixels by switching the polarity of the "on" data voltages supplied to the Y lines from +5 volts during the p-mode to −5 volts during the n-mode. In the voltage driving scheme shown in FIG. 22, on the other hand, the change in polarity across the pixel 551 is accomplished by both (a.) a change in the common voltage supply $V_{cs}$ from the more negative ground voltage to the more positive voltage of +5 volts, and (b.) a reversal of the "on" and "off" data voltages supplied to the Y data lead lines 544, changing the "on" data voltage from +5 volts to ground, and changing the "off" data voltage from ground to +5 volts. During the n-mode, when the sources of all of the transistors 522 are supplied with the more positive voltage of +5 volts, the Y lines 544 discharge, or turn off, pixel in selected rows by supplying the upper electrode with +5 volts, and they charge those pixels to a negative "on" voltage by supplying the upper electrodes with zero volts, which is 5 volts less than the voltage supplied to the bottom pixel electrodes in a selected row.

During the n-mode, the gate voltage supplied on the lines $X_1$, $X_2$ and $X_3$ to turn on the transistors of a selected row is +15 volts, which is higher than the +10 volts used for this purpose during the p-mode. This is to insure that during the n-mode, when the sources 528 of the transistors in a selected row are supplied with +5 volts, the voltage supplied to the gate 524 of those transistors is sufficiently higher than that source voltage to keep the selected transistors fully on.

Referring now to FIG. 23 and 24 an alternate active matrix display useful in the paperless facsimile of the invention is shown. FIG. 23 is a partial top plan view of a bottom substrate subassembly with the voltage supply and control leads located between the pixel rows 514, 515 and 516 combined into one common conductive lead 572. This greatly simplifies the wiring associated with an X-Y pixel array, reducing almost in half the number of address lines required on the bottom substrate subassembly in large X-Y array. As is shown in FIGS. 23 and 24, the top X line 572 is labeled $X_{G1}$ indicating that it is connected to the gates of the first row of pixels. The second X line 572 is labeled $X_{S1\text{-}G2}$, indicating that it is connected to both the sources of the first pixel row and the gates of the second pixel row. Similarly, the third X line 572 shown in those figures is labeled $X_{S2\text{-}G3}$, indicating that it is connected to both the sources of the second pixel rows and the gates of the third pixel row. Finally, the bottom most X line 572 is labeled $X_{S3}$ indicating that it is connected to the sources of the third pixel row.

The bottom substrate subassembly shown in FIG. 23 is combined with the top substrate assembly. When this is done, the resultant light influencing display has a circuit diagram shown in FIG. 24, in which each of the bottom pixel electrodes 520 on the bottom substrate subassembly forms a light influencing pixel 551 in conjunction with its associated transparent Y conductive strip 544. The display shown in FIG. 24 is identical to that shown in FIG. 18 except that the control and voltage supply lines between its pixel rows have been combined, as described above.

Figure 25:
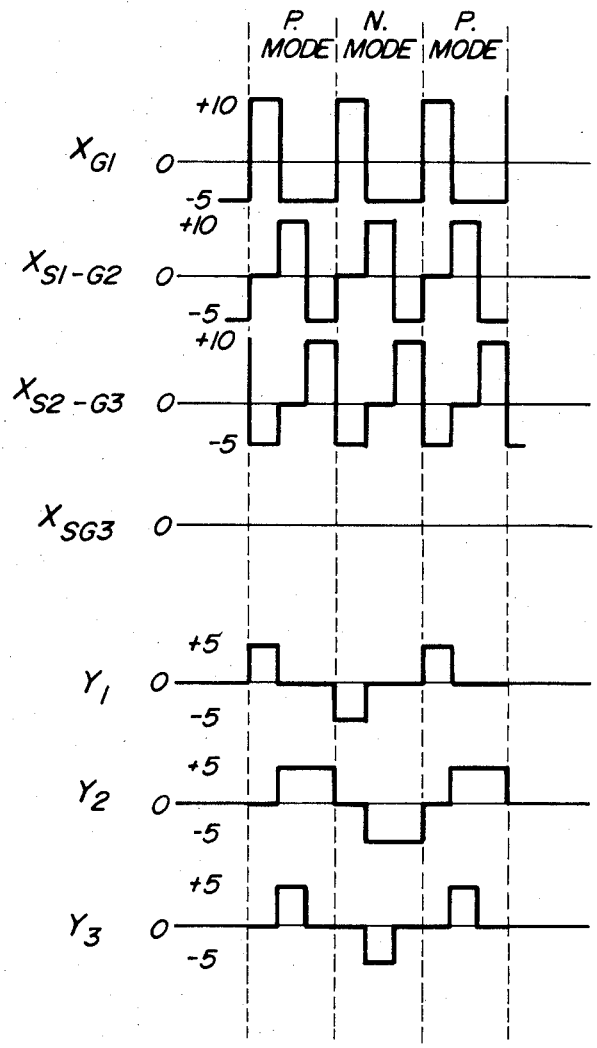
FIG. 25 is a set of wave diagrams showing the signals supplied to the x lines and y lines of the circuit shown in FIG. 24 in order to produce the pixel pattern shown in FIG. 20.

FIG. 25 illustrates the voltage waveforms which are supplied to the X lines 572 and Y lines 544 shown in FIG. 24 in order to make the 3×3 matrix have the image pattern shown in FIG. 20. The voltages supplied to the Y lines shown in FIG. 25 are identical to the voltage supplied to the Y lines shown in FIG. 19. Similarly the voltage supplied to the X line $X_{G1}$ in FIG. 25 is identical to that supplied to the X line $X_1$ in FIG. 19. This is because the X line $X_{G1}$, being connected only to the gates of transistors in the row below it, functions analogously the line $X_1$ in FIG. 19. The voltages supplied to the lines $X_{S1\text{-}G2}$ and $X_{S2\text{-}G3}$, however, are different than those supplied to the lines $X_2$ and $X_3$ in FIG. 19. This is because the lines $X_{S1\text{-}G2}$ and $X_{S2\text{-}G3}$ both supply gate voltages to the row below them and to supply source voltages to the row above them. The lines $X_{S1\text{-}G1}$ and $X_{S2\text{-}G3}$ are capable of performing both functions because these functions occur at different times.

During most of each scanning cycle, the connection of each of these combined source-gate lines to the sources of the transistors in the row above it is without consequence, because the source addressed transistors are turned off, effectively isolating their drains and associated bottom pixel electrodes from the sources. It is only during the brief period when the source addressed transistors in the row immediately above such a line are selected by the application of "on" gate voltages that the connection of a combined source-gate line, $X_{S\text{-}G1}$, to the sources of the source addressed transistors is of significance. During this period a zero or ground voltage is supplied to the combined source-gate line so that a ground voltage is supplied through the selected transistors to their associated bottom row to charge up to the voltage supplied on its associated Y address line.

During the rest of the time, when other pixel rows are selected, the combined source-gate line, $X_{S\text{-}G}$, acts only as a gate voltage supplying line, and voltages supplied to it are identical to those supplied to the corresponding X lines in FIG. 19. When the pixel row directly below a combined source-gate line is selected, that line is supplied with an "on" gate voltage of +10 volts to turn on the transistors of the selected row. During periods in which neither the pixel row directly above nor directly below a given source-gate line is selected, the voltage supplied to that given line is held to a −5 volts to insure that the non-selected transistors in the row directly beneath it remain off.

During the brief period when a source-gate line supplies a ground source voltage to the transistors in the selected row directly above it, it also supplies a ground gate voltage to the transistors in the non-selected row immediately below it. This undesirably high gate voltage for a non-selected row has the effect of enabling transistors in the row immediately beneath the source-gate line to discharge when the bottom pixel electrodes 520 connected to the drains of such transistors are driven to a large negative voltage, such as −10 volts, as described above in the explanation of why a −5 volt gate voltage is normally supplied to the transistors of non-selected rows. However, this brief period in which non-selected rows receive a slightly higher than desired gate voltage has a relatively small effect on the RMS voltage applied to each pixel over each scanning cycle. Such a zero volt gate voltage is only applied to a given on-selected row during the brief period in which the row directly above it is selected. In a large display in which there are many lines, this possible loss of a pixel's charge only one line interval before it is to be rewritten is of little concern.

The voltage supplied to the line $X_{S3}$ is held at ground. This is because this line functions only to supply voltage to the sources of the transistors in the pixel row immediately above it, and thus it is free to remain at ground at all times.

4. Integrated Teleconferencing System

The individual teleconferencing system contemplated herein includes a speech circuit, and a paperless telefacsimile means, i.e., a touch position sensor, a display, and circuits to provide interaction therebetween. The touch position sensor and the display, as well as the speech circuit interact with each other and interface with the communications network through internal data processing systems, including data storage systems, and through interfacing systems. These systems translate analog touch position sensor current flows and potentials into digitized touch position locations, store the digitized touch position location in touch position location digital memory means, update the digital memory means, display the updated memory contents data on the display, transmit either or both of the instantaneous touch position and/or the updated memory contents through a communications network to other output devices, receive inputs to the memory and/or the display through the communications network from other input sources, and send and receive speech communications.

a. Network

Figure 26:
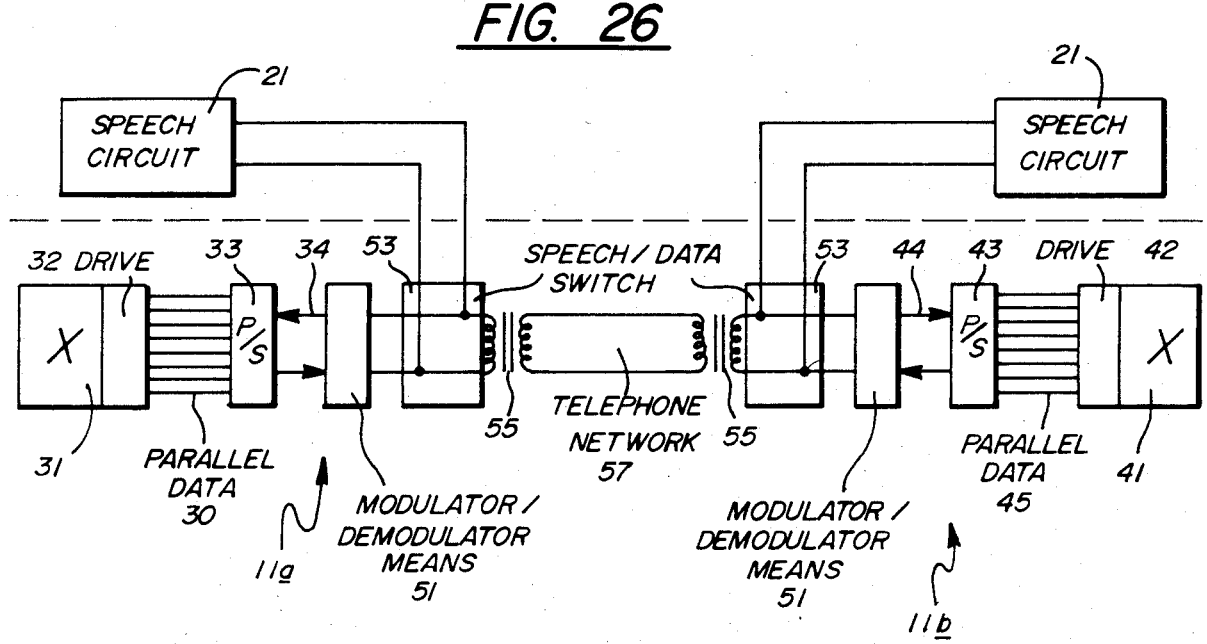
FIGS. 26 and 27 are block diagrams of the teleconferencing system.
Figure 27:
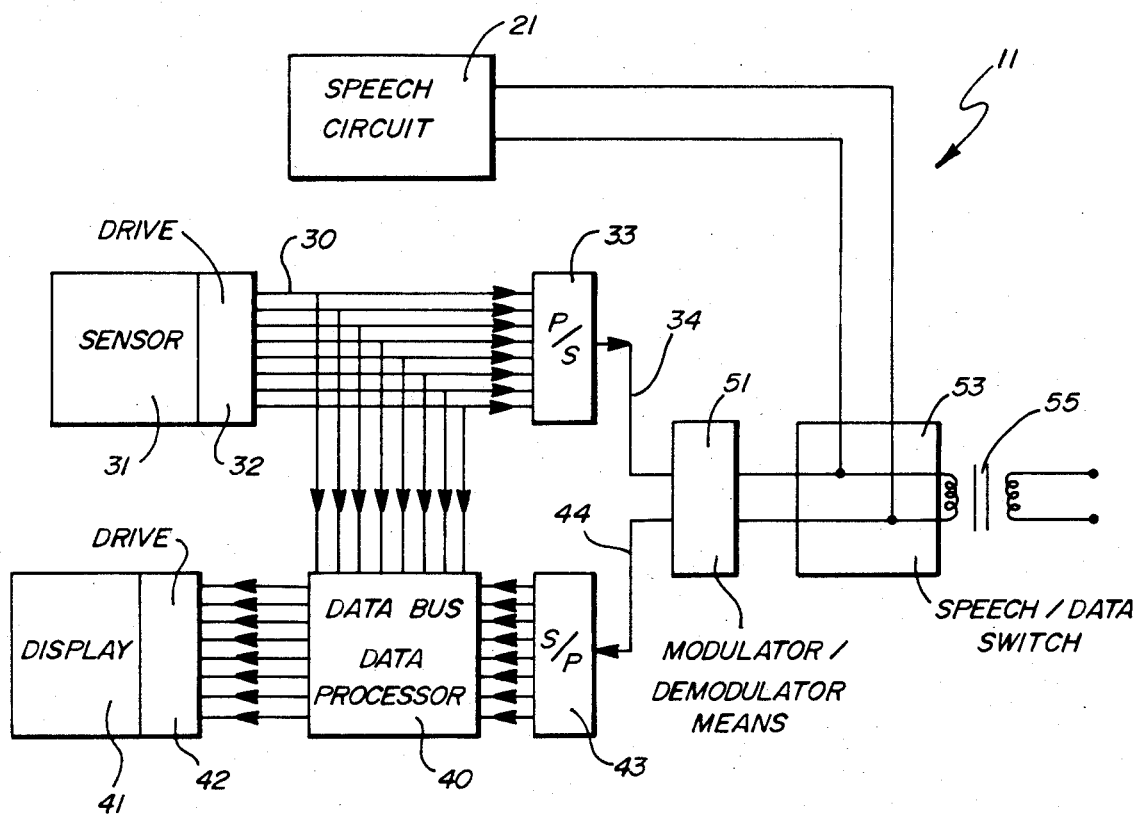

FIGS. 26 and 27 are block diagrams of the teleconferencing system. In FIG. 26, two systems are shown communicating through an analog data network, i.e., a telephone network. The display circuit is omitted from one system, and the touch sensor is omitted from the other system. This is done only as a simplification, since each teleconferencing system includes a complete paperless telefacsimile system with both a touch sensor and a display.

The touch sensor of the paperless telefacsimile means includes means for converting touch point location analog data that is, the unique set of currents and/or voltages identified with a touch point location to digital output. This digital output may be stored internally, displayed on the associated display, or transmitted to a remote location is a digital computer, a remote display, or a remote paperless telefacsimile means. The system for measuring the analog currents and/or voltages of the touch sensative position sensorand converting the analog measurements thereof to digital output is referred to as a touch sensor drive. The digitized output of the touch sensor drive is typically parallel bit digital data, and must be converted to series analog data for data transmission over analog, e.g., telephone lines, to the remote location. The conversion from digital parallel data to series digital data is accomplished in parallel to series conversion means. The serial digital data is then modulated, that is converted to analog data, for example, by a modulator means, for transmission over the analog communication network to the remote location. The analog data signal is demodulated and digitized to a series digital bit stream at the receiving end, for example, in a demodulator. Thereafter, the serial digital data is converted to parallel digital data along the parallel digital data is then input into a display means where it is displayed, and also, if desired, entered into a memory means as digital data.

A two unit teleconferencing network is shown schematically in FIG. 26 and one teleconferencing system is shown schematically in greater detail in FIG. 27. For the sake of simplicity and solely for purposes of illustration only, and not with any intention to limit the scope of the invention thereby, the display 41 is omitted from the transmitting unit 11a of FIG. 26 and the touch position sensor 31 is omitted from the receiving unit 116 of FIG. 26.

The output from the touch position sensor means 31 is represented by parallel bits. While the parallel bit output can be directly inputted to the display means not shown, of the same teleconferencing unit 11a, the parallel bit digital output must first be processed in order to be input to a display means 41 at remote teleconferencing unit 116. This requires conversion to a serial stream of output bits, for example, in a parallel to series conversion means 33. Moreover, if the serial bit stream is to be transmitted over analog transmission lines, as telephone network means 57, it must be changed to analog signals. The analog signals utilized in commercial telephone networks are electrical signals at audio frequencies, i.e. 300 Hz to 3,400 Hz.

Similarly, both for receiving and displaying of the signals at the remote display, and when the individual teleconferencing unit is in a "receive" mode, the analog data input stream must be digitized and, depending on the internal logic of the receiving display, converted from serial input to parallel input.

b. The Individual Telephone-Paperless Telefacsimile Unit

FIG. 26 shows a pair of teleconferencing units 11a and 11b connected through a network 57. FIG. 27 shows an individual teleconferencing unit 11. The teleconferencing unit 11 has a display 41 including drive means 42, and a touch sensor panel 31 including touch sensor panel drive means 32. FIG. 26 shows one unit 11a in a "transmit" mode with data being entered on the touch position sensor 31 and the second unit 11b in a "receive" mode with the data from the touch position sensor 31 of the first unit 11a being displayed on the display 41 of the second unit 11b.

Data is entered on the touch position sensor 31 of the first unit, 11 e.g., by a stylus, a finger touch, or the like. The data is analog data in the form of current flows and/or voltages, and is translated into a set of touch points, each touch point being uniquely defined by a current flow pattern and/or voltage map. This set of touch points is digitized, for example, by an analog to digital convertor incorporated in the drive means 32. The output of the touch sensor drive means 32 is a data stream that is representative of touch point location. This data stream may be a parallel bit stream or a series bit stream. It is shown in the FIG. as an eight bit parallel stream 33.

When the data is recovered from the touch sensor 31 as parallel data, it must be converted in parallel to series conversion means 33 to a serial bit stream 34 for transmission, as will be described hereinbelow.

The output 34 of the parallel to series conversion means 33 cannot be transmitted over the presently existing commercial telephone networks 57 as such. This is because the commercial telephone network 57 is adapted for analog data at audio frequencies, i.e., 300 to 3,400 Hz. Thus, the series digital data 34 must be converted to analog data. This is accomplished in digital to analog convertor means, for example, a modulator means 51. While the digital to analog conversion means and the analog to digital convertor means at the receiving unit may be omitted in a data network using digital transmission, the invention herein contemplated is intended for use in either a digital mode or an analog mode, and therefore is shown and illustrated with the modulator-demodulator means 51, i.e., a modem, which must be provided where voice network or other analog data communication means are employed.

The analog or modulated signal is demodulated, i.e., converted to a digital data signal, for example, in a demodulation means 51 at the receiving teleconferencing unit 11b, computer, display, or the like. The demodulated digital data 144 is in serial digital data form and must, if necessary, be converted to parallel data 45 form. Conversion from serial to parallel data is accomplished in a serial to parallel signal conversion means 43 such as, a UART, a Universal Asynchronous Receiver Transmitter as described hereinbelow.

The parallel data output 45 of the serial to parallel conversion means 43 is the input to the display drive means 42 of the second unit 11b, and the is displayed as analog data by the display means 41 of the second unit 11b.

FIG. 27, shows a more detailed block diagram of an individual teleconferencing unit 11. The teleconferencing unit 11 includes the speech circuit 21, the touch sensor circuit 31, the display circuit 41 and certain circuits, not shown, such as the pulse or tone dialing circuit, acoustical circuits (anti-tinkle, muting, and balancing), and the like. The touch sensitive position sensor 31 and the display 41 may have their own respective parallel to series and series to parallel conversion means 33, 43 as shown in FIG. 27. Alternatively, the touch sensor circuit and the display circuit may share a common means for converting parallel bit data to serial bit data and serial bit data to parallel bit data. There are also data bus means 40 or data bus means combined with suitable data processing means that allow the output of the touch sensor 31 to be direct or processed input to the associated display means 41 and directly inputted thereto.

The parallel output 30 of the touch position sensor 31 is converted to series digital data 34 by the parallel to series to conversion means 33. The series output 34 of the parallel to series convertion means 33 associated with the touch position sensor 31 is modulated, i.e., converted to analog data, for example, in modulator means 51 and the series input to the display serial to parallel convertor is demodulated in demodulating means 51. The modulating means 51 and demodulating means 51 may be combined into a single element, i.e., a modulating-demodulating means or modem. The touch position sensor 31 and display 41 interact through the modulator-demodulator means 51 and may interact through data bus and data storage means 40 which buffer the output of the touch position sensor 31 as input to the display 41, and update it with inputs 30 from the touch position sensor 31 and input 44 from the remote unit 11b.

The modulator means and demodulator means 51 and 51, for example modems, take digital output from the UART 33 and modulate it to the analog carrier signal of telephone network 55. The demodulator means 51 receives a modulated analog carrier signal and delivers a serial digital display input 44 to the UART 43.

The speech circuit 21 is well known in the art.

A speech and data switch means 53 is provided. This switch 51, in combination with asynchronous data transmission and with storage of a transmitted touch sensor output, allows a form of time domain multiplexed "simultaneous" voice and data transmission. The switch 57 may be a manual switch, for example on the touch pad or on the telephone hand set. Alternatively, it may be a logical switch driven by a particular duration of the signal, for example the logical 0, the logical 1, or the carrier frequency continuously transmitted over the analog network.

While the invention generally and the multiplexing of voice and data transmissions particularly are illustrated with respect to an asynchronous or "hand shake" data transmission mode rather than a synchronous or clock controlled data transmission mode, it is to be understood that the invention may also be used with synchronous or with isochronous data transmission. Switching between sending and receiving modes is unnecessary in the asynchronous, full multiplex mode because of the different frequencies utilized. Moreover, in the asynchronous mode, switching between voice transmission and data transmission mode may be accomplished by measuring the duration of a string of carrier frequency signal only, with a switch to voice after some preset time of carrier frequency only, or by measuring a string of a signal that has frequencies separate and distinct from either those corresponding to logical "0" or logical "1", with a switch to the voice mode after some predetermined duration thereof or after a predetermined string of unchanging logical "0" or "1". Alternatively, switching between voice and data may be by a manual switch, or by a unique signal identified to contact between the stylus 30 and the touch position sensor 31.

The interaction of the touch position sensor 31 and the display 41 through the data bus and data processor 40 allows local and remote display of the data entered into the touch position sensor 31 as well as local and remote entry of data into the display 41.

c. Parallel To Series Conversion

Various parallel-series conversion means are known in the art. One well known parallel-series conversion means is a universal asynchronous receiver transmitter, also referred to as a UART. The digitized data may be sent therefrom in any software compatible code, for example, 5 bit CCITT, 7 bit ASCII, 8 bit ASCII, and may be sent in even or odd parity. The connection between the two units may be synchronous, that is with a common clock means, or asynchronous, referred to in the art as "hand shake" communications, or isochronous.

The Universal Asynchronous Receiver Transmitter (UART) allows reception and transmission of serial data to be done by hardware rather than software. Hardware for serial to parallel and parallel to serial conversion is a Universal Asynchronous Receiver Transmitter or UART. The modern integrated UART provides separate, independent transmitter and receiver means for serial data with two clock inputs to determine the baud rate. The provision of separate receiver and transmitter circuits in one unit allows full duplex operation to take place. An important feature of the UART as it is interfaced to, for example either or both the touch position sensor 31 and/or the display 41 is that its input to the display 41 and its output from the touch position sensor 31 both appear to the display and touch sensor pad, respectively, to be parallel, for example 8 bit parallel data. This is because the UART simply writes a byte to the parallel output port and reads a bite from the demodulator input port. The UART serializes the data, inserts parity bits, and controls the data rate.

d. Modulation-Demodulation

The interface of the unit 11 with the acoustical analog telephone network 57 through interconnect means 55 is determined by the limitations of the network 57. This is because there is only a limited amount of band width that is practically available to carry voice communications. At the present time, the lowest cost telephone data communication means are voice channels adapted for a band width from 300 Hz to 3,400 Hz. It is therefore necessary to modulate the 300 to 3,400 Hz carrier frequency to carry the digital image data from paperless telefacsimile 31-41 of the teleconferencing 11a to the paperless telefacsimile 31-41 of teleconferencing unit 11b. This may be done within the available band width by modulating the carrier amplitude, that is, by modulating the amplitude between a high amplitude for logical "1" and a low amplitude for logical "0". Alternatively, the frequency may be modulated, for example, between high frequency logical 1 and low frequency for logical 0. According to a still further embodiment, phase of the carrier may be shifted, for example, shifted in one direction for a logical 1 and in an opposite direction for a logical 0. This is a technique known as, "phase key shifting".

Figure 28:
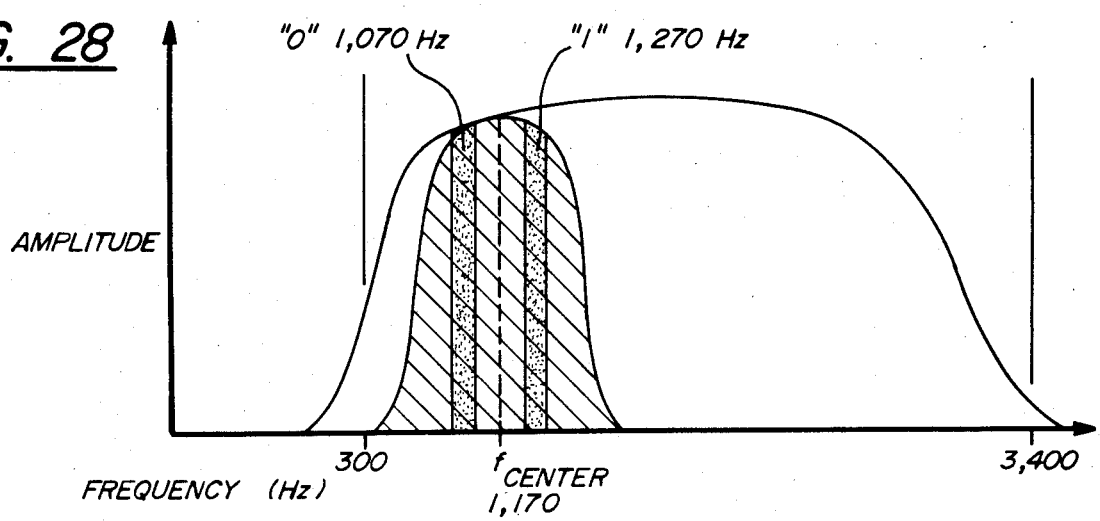
FIG. 28 is an amplitude versus frequency plot for simplex or half duplex transmission modulation.
Figure 29:
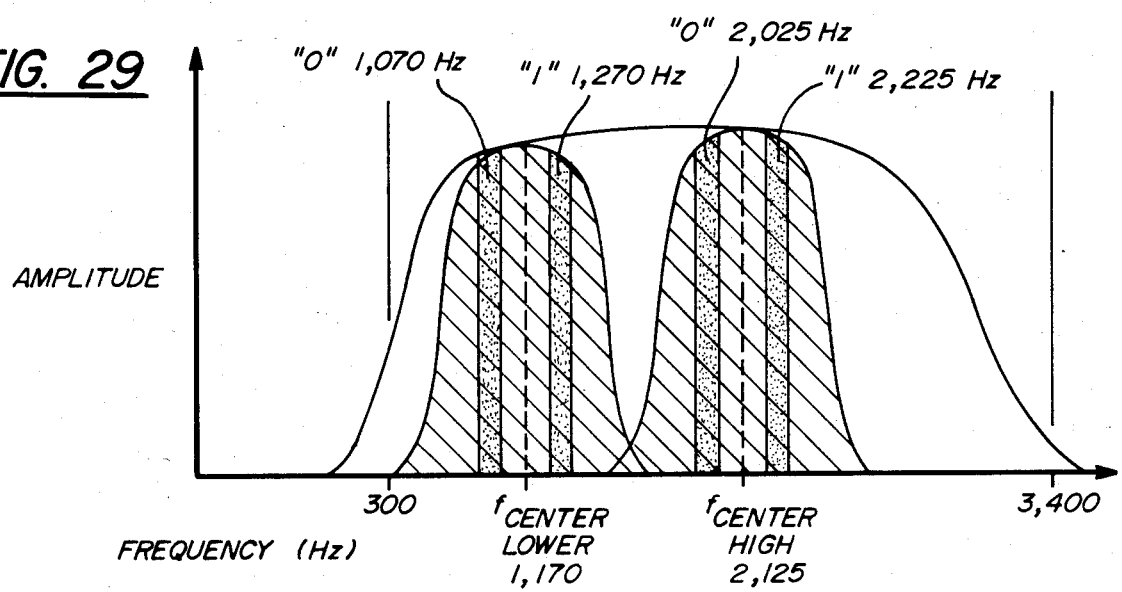
FIG. 29 is an amplitude versus frequency plot for full duplex transmission modulation.
Figure 30:
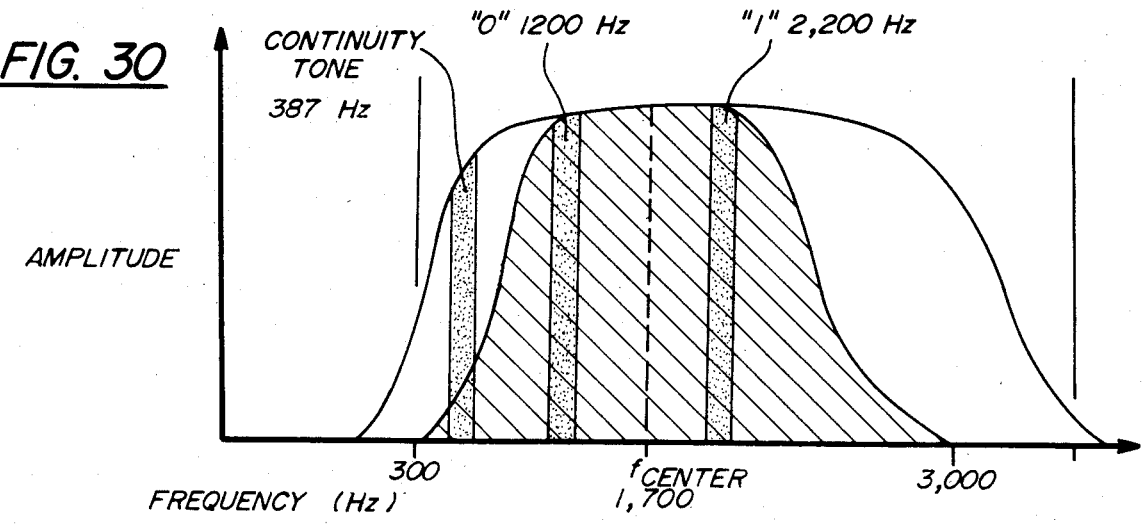
FIG. 30 is an amplitude versus frequency plot for 1200 baud modulation.

As stated, the available band width is from 300 Hz to 3,400 Hz. However, the output from a touch position sensor pad 31 and the input to a display 41 are high frequency signals. These signals must be modulated, that is converted to electrical signals having frequencies in the audible band width in order to be carried over the 300 Hz to 3,400 Hz voice network. More specifically, FIGS. 28, 29 and 30, show the frequency spectrum used for data communication over a voice communication network. With FIGS. 28 and 29 show the frequency spectrum used for low speed asynchronous modulation-demodulation means, with FIG. 28 showing the frequency spectrum for a simplex or half transmission mode, and FIG. 29 showing the frequency spectrum for a full duplex transmission mode.

In the simplex or half transmission mode, that is, the frequency spectrum shown in FIG. 28, the frequency spectrum from 300 to 3,400 Hz is available for data transmission. A central frequency of 1,170 Hz is used for the carrier which is shifted to 1,070 Hz for the logical "0" and to 1,270 Hz for the logical "1".

In the full duplex mode for full two-way data communication, shown in FIG. 29, the frequency spectrum of 300 to 3,400 Hz is again available for data transmission. This spectrum is divided into two band widths as shown in FIG. 29. One band width is a lower frequency band width having a central frequency of 1,170 Hz. The other band width is a higher frequency band width having a central frequency of 2,125 Hz. The lower frequency band width with a central frequency of 1,170 Hz transmits a logical "0" by switching to 1,070 Hz and a logical "1" by switching to 1,270 Hz. The higher frequency band width with a central frequency of 2,025 Hz transmits a logical "0" by switching to 2,125 Hz and logical "1" by switching to 2,225 Hz.

FIG. 30 shows the frequency spectrum for high speed asynchronous data transmission, for example 1,200 bytes per second. Although this frequency may not be necessary for the use of the herein contemplated teleconferencing system, certain advantages are offered by a design capable of high speed, asynchronous, full duplex, data transmission. In the 1,200 bytes per second asynchronous modem, the frequency spectrum has a central frequency of 1,700 Hz, a continuity tone at 387 Hz, a logical 0 at 1,200 Hz and a logical 1 at 2,200 Hz. The 1,000 Hz spread between 0 and 1 is necessary because the higher data rate of 1,200 bytes per second requires a wider band width for separating logical "0" from logical "1". As a result of this 1,000 Hz separation there is not enough band width between 300 Hz and 3,400 Hz for full duplex operation. However, the single frequency signal at 387 Hz can be transmitted from the receiving unit 11b to the sending unit 11a, while the 1,200 bytes per second data are being transmitted over the 1,200 Hz and 2,200 Hz frequencies. This 387 Hz reverse channel is normally used to transmit and maintain a continuity tone that allows the receiving unit 11b to tell the transmitting unit 11a that the circuit is established. However, some data may be sent using on/off keying of the 387 Hz tone.

Additionally, modulator-demodulators are available to perform more advanced modulation techniques in the 1,200 bytes per second data transmission range.

While the individual circuitry of the serial to parallel and parallel to signal conversion means and the modulation and demodulation means do not form a part of the invention, their combination with the speech circuit and the touch sensitive position sensor and display of the electronic paperless telefacsimile means form the interactive system that is the key to the invention. Various equivalent circuits may be utilized to form these data processing components of the integrated system, for example a General Instruments AY-5-1013 integrated circuit UART may be used as the universal asynchronous receiver transmitter element while a TMS99532 modem made by Texas Instruments may be a single integrated circuit modem or modulation-demodulation means useful in providing the modulation-demodulating function in the telephone pad herein contemplated.

While the invention has been described with respect to certain preferred exemplifications and embodiments, those exemplifications and embodiments are not intended to define or otherwise limit the scope of the instant invention; but, rather the instant invention is to be defined solely by the claims appended hereto.

I claim:

1. A teleconferencing system adapted for transmission of speech and image data, said system comprising:
   a. speech circuit means adapted to transmit and receive speech acoustical data;
   b. touch position sensor image data input means for converting analog image data to first digital image data, and display means substantially integral with said image data input means for displaying said first digital image data;
      i. said touch position sensor image data input means comprising:
         (a). a transparent conductive surface disposed integrally with said display means;
         (b). two pairs of diode controlled current distribution and collection means, each member of a pair being parallel to and spaced from the other member of the pair, the two pairs being orthogonal to each other, and operatively associated with said conductive surface for establishing a uniform electric field on said conducive surface;
         (c). resistance means electrically interconnecting said current distribution and collection means and said conductive surface;
         (d). control means operatively associated with said current distribution and collection means and adapted to sequentially turn on one set of said current collection and distribution means and simultaneously turn off the other set of current distribution and collection means; and
         (e). means for determining the distribution of the electric field across said surface and correlating said field distribution with the location of a touch point on said surface;
      (ii). said display means being an active matrix liquid crystal light influencing display means having a plurality of pixels arranged to form pixel rows and columns in an x-y array thereof, so that each pixel belongs to a pixel row and a pixel column, each pixel having non-linear isolation means between individual pixels, and comprising:
         (a). an insulative substrate;
         (b). a first pixel electrode formed on said substrate;
         (c). first address lead means formed on said substrate;
         (d). first non-linear isolation means in series between said first address lead means and said first pixel electrode;
         (e). second address lead means insulated from said first address lead means;
         (f). second non-linear isolation means in series with said first electrode means and said second address lead means;
         (g). a second pixel electrode spaced from and substantially parallel to said first pixel electrode; and
         (h). light influencing means disposed between at least said electrodes;
   c. transmitting means for transmitting outgoing analog image data to a telecommunications network;
   d. receiving means for receiving incoming analog image data from the telecommunications network; and
   e. processing means for processing analog data and storing digital date to form an image display, including modulating means for converting the first digital image data to outgoing analog image data, said demodulating means for converting incoming analog image to second digital image data; and
   f. switch means for switching said teleconferencing system between
      (i). transmitting and receiving speech acoustical data; and
      (ii). transmitting and receiving modulated image data.

2. The teleconferencing system of claim 1, wherein electrically anisotropic resistance means electrically interconnect said conductive surface to said current distribution and collection means.

3. The teleconferencing system of claim 2, wherein said electrically anisotropic means comprises an electrically resistive polymeric matrix with conductive material distributed therewithin.

4. The teleconferencing system of claim 1, wherein said current distribution and collection means comprise elongated distributed diode means.

5. The teleconferencing system of claim 4, wherein said elongated distributed diode means comprise a plurality of vertically superposed, coextensive thin film layers of semiconductor alloy material deposited on a substrate.

6. The teleconferencing system of claim 5, wherein said distributed diode means includes an elongated layer of conductive material disposed on the side of said thin film layers opposite said substrate, said elongated layer of conductive material having a sheet impedance greater than the sheet impedance of the plurality of thin film layers.

7. The teleconferencing system of claim 5, wherein one of a set of said current distribution and collection means include superposed layers of PIN semiconductor alloy material and the other of said set of current distribution and collection means include superposed layers of NIP semiconductor alloy material.

8. The teleconferencing system of claim 1 wherein said conductive surface is formed from a transparent conductive oxide.

9. The teleconferencing system of claim 8, wherein said transparent conductive oxide is selected form the group consisting essentially of indium tin oxide, tin oxide, zinc oxide, antimony doped tin oxide, and combinations thereof.

10. The teleconferencing system of claim 1, wherein said isolation devices are diodes formed from deposited semiconductor material.

11. The teleconferencing system of claim 1, wherein said pixel electrodes comprises a transparent conductive material; said transparent conductive material being indium tin oxide.

12. The teleconferencing system of claim 1, wherein said first and second isolation devices each comprise a plurality of series connected diodes.

13. The teleconferencing system of claim 1, wherein said isolation devices are transistors.

14. The teleconferencing system of claim 13, wherein said transistors are thin film field effect transistors and said current path terminals are source electrodes and drain electrodes.

15. The data input and display means of claim 14, wherein said thin film transistors have channel regions formed of deposited semiconductor material.

16. The data input and display means of claim 15, wherein said deposited semiconductor material comprises silicon.

17. The data input and display means of claim 16, wherein said semiconductor material is an amorphous alloy of silicon.

18. A teleconferencing system adapted for transmission of speech and image data, said system comprising:
 a. speech circuit means adapted to transmit and receive speech acoustical data;
 b. touch position sensor image data input means for converting analog image data to first digital image data, and display means substantially integral with said image data input means for displaying said first digital image data;
  i. said touch position sensor image data input means comprising:
   (a). a transparent conductive surface disposed integrally with said display means;
   (b). two pairs of thin film distributed diode controlled current distribution and collection means, each member of a pair being parallel to and spaced from the other member of the pair, the two pairs being substantially orthogonal to each other, and operatively associated with said conductive surface for establishing a uniform electric field across said conductive surface, said thin film distributed diode controlled current distribution and collection means comprising a plurality of vertically superposed, substantially coextensive, thin film layers of semiconductor alloy deposited on a substrate;
   (c). electrically anisotropic resistance means electrically interconnecting said current distribution and collection means and said conductive surface;
   (d). control means operatively associated with said current distribution and collection means and adapted to sequentially turn on one set of said current collection and distribution means and simultaneously turn off the other set of current distribution and collection means; and
   (e). means for determining the distribution of the electric field across said surface and correlating said field distribution with the location of a touch point on said surface;
  (ii). said display means being an active matrix liquid crystal light influencing display means having a plurality of pixels arranged to form pixel rows and columns in an x-y array thereof, so that each pixel belongs to a pixel row and a pixel column, each pixel having non-linear isolation means between individual pixels, and comprising:
   (a). an insulative substrate;
   (b). a first pixel electrode formed on said substrate;
   (c). first address load means formed on said substrate;
   (d). first non-linear isolation means in series between said first address lead means and said first pixel electrode;
   (e). second address lead means insulated from said first address lead means;
   (f). second non-linear isolation means in series with said first electrode means and said second address lead means;
   (g). a second pixel electrode spaced from and substantially parallel to said first pixel electrode; and
   (h). light influencing means disposed between at least said electrodes;
 c. transitting means for transmitting outgoing analog image data to a telecommunications network;
 d. receiving means for receiving incoming analog image data from the telecommunications network; and
 e. processing means for processing analog data and storing digital data to form an image display including modulating means for converting the first digital image data to outgoing analog image data, and demodulating means for converting incoming analog image data to second digital image data; and
 f. switch means for switching said teleconferencing system between
  (i). transmitting and receiving and receiving speech acoustical data; and
  (ii). transmitting and receiving modulated image data.

19. The teleconferencing system of claim 18, wherein said first and second non-linear isolation means are diodes.

* * * * *